US012658356B2

(12) United States Patent
Arimitsu et al.

(10) Patent No.: US 12,658,356 B2
(45) Date of Patent: Jun. 16, 2026

(54) COIL DEVICE

(71) Applicant: TDK CORPORATION, Tokyo (JP)

(72) Inventors: Kazunori Arimitsu, Tokyo (JP); Nobuo Kitajima, Tokyo (JP); Kiichi Fujisawa, Tokyo (JP); Fuyuki Miura, Tokyo (JP); Takehiko Narisawa, Tokyo (JP); Makoto Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 800 days.

(21) Appl. No.: 17/984,020

(22) Filed: Nov. 9, 2022

(65) Prior Publication Data

US 2023/0162906 A1 May 25, 2023

(30) Foreign Application Priority Data

Nov. 19, 2021 (JP) ................................ 2021-188780

(51) Int. Cl.
*H01F 17/04* (2006.01)
*H01F 27/29* (2006.01)

(52) U.S. Cl.
CPC .................................... *H01F 27/29* (2013.01)

(58) Field of Classification Search
CPC ...................................................... H01F 27/29
USPC .................................................. 336/192, 221
See application file for complete search history.

(56) References Cited

U.S. PATENT DOCUMENTS

2014/0002227 A1* 1/2014 Hsieh ...................... H01F 5/003
336/200
2020/0211760 A1* 7/2020 Brassfield ........... H01F 41/0246

FOREIGN PATENT DOCUMENTS

JP 2015-115341 A 6/2015
JP 2018-133402 A 8/2018

* cited by examiner

*Primary Examiner* — Ronald Hinson
(74) *Attorney, Agent, or Firm* — Oliff PLC

(57) ABSTRACT

An inductor 1 includes a coil 2 made of a flat wire, a terminal 4*a* including a wire connecting portion 42*a* connected to a lead portion 3*a* of the coil 2, a terminal 4*b* including a wire connecting portion 42*b* connected to a lead portion 3*b* of the coil 2, and a core 8 that covers the coil 2 together with the wire connecting portion 42*a* and the wire connecting portion 42*b*. The wire connecting portion 42*a* is positioned outside the lead portion 3*a* that is led out in a front-rear direction of the core 8, along a left-right direction of the core 8. The wire connecting portion 42*b* is positioned outside the lead portion 3*b* that is led out in the front-rear direction of the core 8, along the left-right direction of the core 8.

15 Claims, 15 Drawing Sheets

COIL DEVICE

BACKGROUND OF THE INVENTION

Field of the Invention

The present invention relates to a coil device used as, for example, an inductor.

Description of the Related Art

As a coil device known as an inductor or the like, for example, a coil device described in Japanese Patent Laid-Open No. 2018-133402 (Patent Literature 1) is known. The coil device described in Patent Literature 1 includes an element body, a coil disposed inside the element body, and a terminal connected to a lead portion of the coil. The terminal includes a wire connecting portion to which the lead portion of the coil is fixed, and a locking piece that clamps the lead portion of the coil fixed to the wire connecting portion.

The coil device described above is obtained by disposing a coil and a terminal (a terminal in a state of being connected with the lead portion of the coil) inside a mold, filling the mold with a magnetic material that constitutes the element body, and performing compression molding. In the coil device described in Patent Literature 1, since the lead portion of the coil is fixed to the wire connecting portion and clamped by the locking piece, problems such as disconnection of the lead portion of the coil due to pressure during compression molding can be prevented.

However, in the coil device described in Patent Literature 1, the following problems may occur during compression molding. That is, in the coil device described in Patent Literature 1, the locking piece clamps the lead portion of the coil so as to wind around the lead portion of the coil fixed to the wire connecting portion. Therefore, a part of the locking piece (and a part of the wire connecting portion) is disposed protruding inside the lead portion of the coil (a space sandwiched between the lead portion of the coil and an outer peripheral surface of the coil), and thus it is difficult to fill a sufficient amount of the element body inside the lead portion of the coil (a space surrounded by the lead portion of the coil, the outer peripheral surface of the coil, and the locking piece) due to this protruding. Therefore, a density of the element body cannot be sufficiently ensured, and inductance characteristics of the coil device may deteriorate.

In order to avoid the above-described problem, for example, it is conceivable to increase pressure during the compression molding to forcibly push the element body into the above-described space inside the lead portion of the coil. However, such high-pressure molding may lead to problems such as deformation of the coil, which is a factor in degrading quality of the coil device.

SUMMARY OF THE INVENTION

The present invention is made in view of such circumstances, and an object thereof is to provide a coil device having good inductance characteristics and high quality.

In order to achieve the above object, a coil device according to the present invention includes:

- a first terminal including a first wire connecting portion connected to a first lead portion of a coil;
- a second terminal including a second wire connecting portion connected to a second lead portion of the coil; and
- an element body covering the coil together with the first wire connecting portion and the second wire connecting portion, in which
- the first lead portion is led out in a front-rear direction of the element body,
- the second lead portion is led out in the front-rear direction of the element body,
- the first wire connecting portion is positioned outside the first lead portion along a left-right direction perpendicular to the front-rear direction of the element body, and
- the second wire connecting portion is positioned outside the second lead portion along the left-right direction perpendicular to the front-rear direction of the element body.

In the coil device according to the present invention, the first wire connecting portion is positioned outside the first lead portion along the left-right direction of the element body. Therefore, the first wire connecting portion does not significantly protrude inside the first lead portion (the space sandwiched between the first lead portion and the outer peripheral surface of the coil), and when the space inside the first lead portion is filled with the element body, the first wire connecting portion does not become a physical obstacle to this filling. Therefore, it is possible to fill the space inside the first lead portion with a sufficient amount of the element body without being obstructed by the first wire connecting portion (similarly, it is possible to fill the space inside the second lead portion with a sufficient amount of the element body without being obstructed by the second wire connecting portion), and the density of the element body can be sufficiently secured, and a coil device having good inductance characteristics can be obtained.

During compression molding, the space inside the first lead portion and the space inside the second lead portion can be easily filled with a sufficient amount of the element body without using high-pressure molding, and it is possible to prevent occurrence of defects such as deformation of the coil device and obtain a high-quality coil device.

Preferably, the coil is disposed inside the element body such that each of thickness directions of the first lead portion and the second lead portion substantially coincide with the left-right direction of the element body, an outer surface in the thickness direction of the first lead portion is mainly connected to an inner edge of the first wire connecting portion, and an outer surface in the thickness direction of the second lead portion is mainly connected to an inner edge of the second wire connecting portion. By using the outer surface of the first lead portion as a connecting surface with the first wire connecting portion and connecting the outer surface to the inner edge of the first wire connecting portion, it is possible to effectively prevent the first wire connecting portion from protruding into the space inside the first lead portion. Similarly, by using the outer surface of the second lead portion as a connecting surface with the second wire connecting portion and connecting the outer surface to the inner edge of the second wire connecting portion, it is possible to effectively prevent the second wire connecting portion from protruding into the space inside the second lead portion. Accordingly, formation of physical obstacles that obstruct the filling of the element body in the space inside the first lead portion and the space inside the second lead portion can be prevented, and the spaces can be easily filled with a sufficient amount of the element body.

Preferably, the first lead portion is connected to the first wire connecting portion at a first connecting portion, the second lead portion is connected to the second wire connecting portion at a second connecting portion, the first connecting portion is unevenly distributed outside the first lead portion in a thickness direction of the first lead portion, and the second connecting portion is unevenly distributed outside the second lead portion in a thickness direction of the second lead portion. With such a configuration, the first connecting portion does not protrude significantly into the space inside the first lead portion, and when the space inside the first lead portion is filled with the element body, the first connecting portion does not become a physical obstacle to this filling. Similarly, the second connecting portion does not protrude significantly into the space inside the second lead portion, and when the space inside the second lead portion is filled with the element body, the second connecting portion does not become a physical obstacle to this filling. Therefore, the space inside the first lead portion and the space inside the second lead portion can be easily filled with a sufficient amount of the element body without being obstructed by the first connecting portion and the second connecting portion.

Preferably, the first lead portion and the second lead portion are led out in substantially the same direction along the front-rear direction of the element body. With such a configuration, when connecting the first lead portion and the second lead portion to the first wire connecting portion and the second wire connecting portion, respectively, by laser welding for example, it is possible to irradiate the first lead portion and the second lead portion with laser from the same direction, and laser welding is easy.

Preferably, when the element body is viewed from the front-rear direction, at least a part of the first lead portion is positioned inside a first lead-out position on an outer peripheral surface of the coil from which the first lead portion is led out, and at least a part of the second lead portion is positioned inside a second lead-out position on the outer peripheral surface of the coil from which the second lead portion is led out, along the left-right direction of the element body. With such a configuration, an elastic force that tries to return the first lead portion to the first lead-out position acts on the first lead portion, so that the first lead portion is fixed to the first wire connecting portion in a biased state. Similarly, an elastic force that tries to return the second lead portion to the second lead-out position acts on the second lead portion, so that the second lead portion is fixed to the second wire connecting portion in a biased state. Therefore, connection between the first lead portion and the first wire connecting portion can be maintained satisfactorily, and connection between the second lead portion and the second wire connecting portion can be maintained satisfactorily.

Preferably, the first terminal further includes a first base portion disposed substantially parallel to a bottom surface of the element body, the second terminal further includes a second base portion disposed substantially parallel to the bottom surface of the element body, the first wire connecting portion extends upward from the first base portion, and the second wire connecting portion extends upward from the second base portion. With such a configuration, it is possible to appropriately adjust a height of the first wire connecting portion according to a height of the first lead-out position, and the first lead portion can be led out to the position of the first wire connecting portion and connected thereto without being bent unnecessarily. Similarly, it is possible to appropriately adjust a height of the second wire connecting portion according to a height of the second lead-out position, and the second lead portion can be led out to the position of the second wire connecting portion and connected thereto without being bent unnecessarily.

Preferably, an inner edge of the first base portion is positioned outside an inner surface of the first lead portion in a thickness direction of the first lead portion along the left-right direction of the element body, and an inner edge of the second base portion is positioned outside an inner surface of the second lead portion in a thickness direction of the second lead portion along the left-right direction of the element body. With such a configuration, the first base portion does not protrude significantly into the space inside the first lead portion, and when the space inside the first lead portion is filled with the element body, the first base portion does not become a physical obstacle to this filling. Therefore, it is possible to fill the space inside the first lead portion with a sufficient amount of the element body without being obstructed by the first base portion (similarly, it is possible to fill the space inside the second lead portion with a sufficient amount of the element body without being obstructed by the second base portion), and the density of the element body can be sufficiently secured, and a coil device having good inductance characteristics can be obtained.

Preferably, a position of an end portion of the first wire connecting portion along a winding axis direction of the coil and a position of an end portion of the second wire connecting portion along the winding axis direction of the coil are displaced from each other. With such a configuration, when the first lead-out position and the second lead-out position are displaced from each other along a winding axis of the coil, it is possible to adapt the height of the first wire connecting portion to the height of the first lead-out position, and to adapt the height of the second wire connecting portion to the height of the second lead-out position. Therefore, the first lead portion can be led out to the position of the first wire connecting portion and connected thereto without being bent unnecessarily. The second lead portion can be led out to the position of the second wire connecting portion and connected thereto without being bent unnecessarily.

Preferably, the first lead portion is positioned above the second lead portion along a winding axis direction of the coil, and a length of the first wire connecting portion along the winding axis direction of the coil is longer than a length of the second wire connecting portion along the winding axis direction of the coil. With such a configuration, it is possible to match the position of the first wire connecting portion to the height of the first lead-out position, and the first lead portion can be led out to the position of the first wire connecting portion and connected thereto without being bent unnecessarily.

Preferably, a notch portion cut along a winding axis direction of the coil is formed on an inner edge of the first wire connecting portion, and the first lead portion is fixed at a position spaced upward from a bottom of the notch portion in the winding axial direction. By forming the notch portion for fixing the first lead portion on the inner edge of the first wire connecting portion, it is possible to reduce a size of the first wire connecting portion, and it is possible to effectively prevent the first wire connecting portion from protruding into the space inside the first lead portion. By fixing the first lead portion to the notch portion, it is possible to prevent the first lead portion itself from protruding significantly toward a center of the coil, and formation of an area that is difficult to be filled with the element body can be effectively prevented in the space inside the first lead portion. By fixing the first lead portion at the position spaced upward from the bottom of the notch portion, even if the first lead-out position of the first lead portion varies along the winding axis direction of the coil, the first lead portion can be reliably fixed to the notch portion without contacting the bottom of the notch portion.

Preferably, the first lead portion is connected to the first wire connecting portion at a position spaced upward from an upper surface of the first base portion, and the second lead portion is placed on the second base portion and connected to the second wire connecting portion. With such a configuration, the first lead portion and the second lead portion can be led out to the positions of the first wire connecting portion and the second wire connecting portion and connected thereto without being bent unnecessarily. Since the second lead portion is fixed to the second base portion, it is possible to effectively prevent displacement of the second lead portion (and the entire coil) due to pressure during compression molding.

Preferably, the first base portion includes a first main branch portion and a first sub branch portion, the first main branch includes a first main protruding portion protruding forward of the element body, the first sub branch portion includes a first sub protruding portion protruding rearward of the element body, and one of the first main protruding portion and the first sub protruding portion is displaced from the other of the first main protruding portion and the first sub protruding portion along the left-right direction of the element body. With such a configuration, the first terminal can be prevented from coming off from the element body and displacement of the first base portion in the element body can be prevented particularly in the left-right direction of the element body by an anchoring effect of the first main protruding portion and the first sub protruding portion. By displacing one of the first main protruding portion and the first sub protruding portion relative to the other along the left-right direction of the element body, an area occupied by the first main protruding portion and the first sub protruding portion inside the element body can be sufficiently ensured, so that the above effect can be effectively obtained.

Preferably, an outer edge of the first main branch portion is curved forward from a side of the element body inside the element body, an outer edge of the first sub branch portion is curved rearward from a side of the element body inside the element body, and a radius of curvature of the outer edge of the first main branch is different from a radius of curvature of the outer edge of the first sub branch portion. With such a configuration, the first terminal can be prevented from coming off from the element body and displacement of the first base portion in the element body can be prevented particularly in the left-right direction of the element body by an anchoring effect of the first main branch portion and the first sub branch portion. By making the radius of curvature of the outer edge of the first main branch portion different from the radius of curvature of the outer edge of the first sub branch portion, the first main branch portion or the first sub branch portion may be provided with a sufficient size to achieve the above effect, so that the above effect can be effectively obtained.

DETAILED DESCRIPTION OF THE PREFERRED EMBODIMENTS

Figure 1:
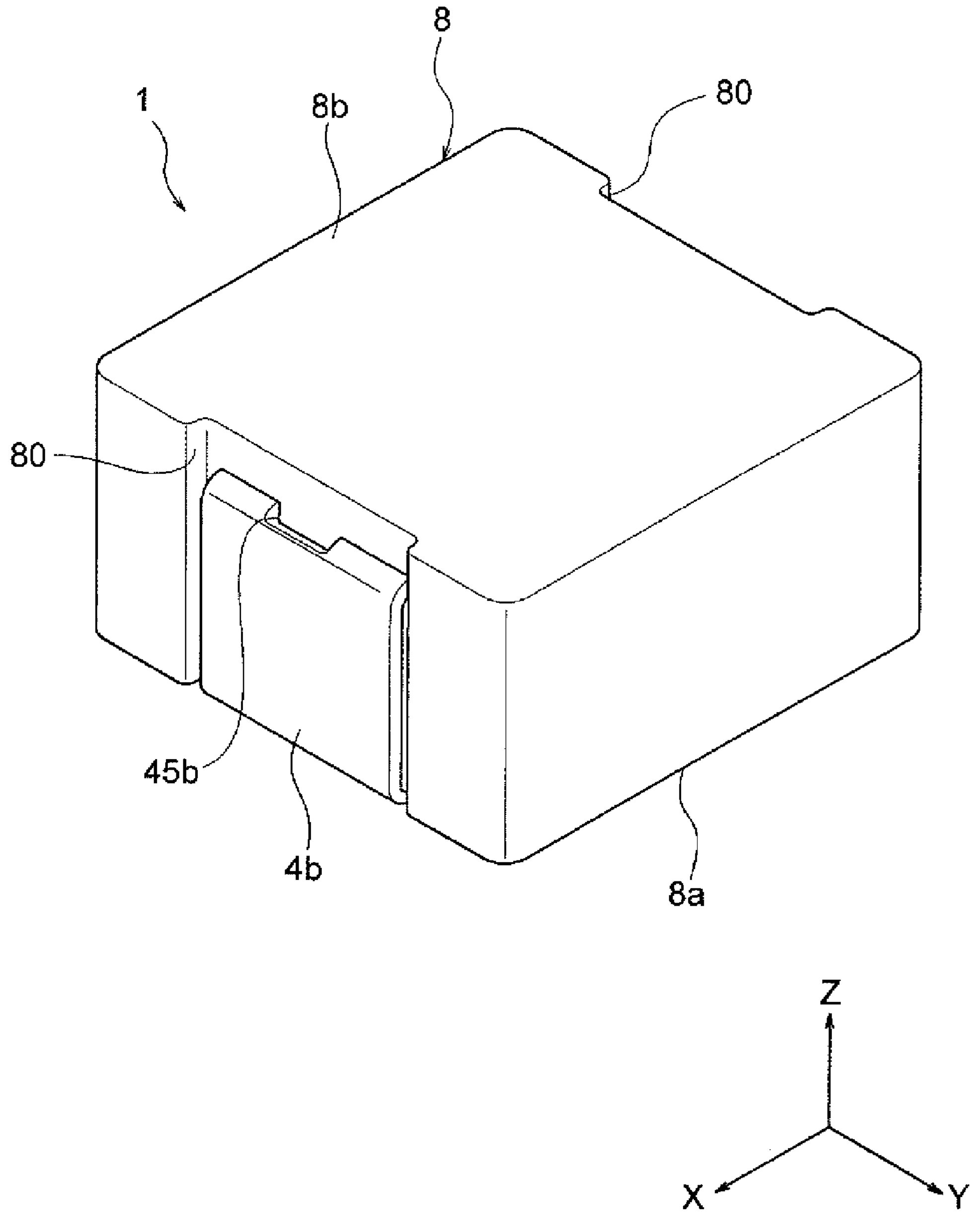
FIG. 1 is a perspective view of a coil device according to a first embodiment of the present invention.

Hereinafter, the present invention will be described based on embodiments shown in the drawings.

First Embodiment

As shown in FIG. 1, an inductor 1 according to a first embodiment of the present invention is a surface-mounted inductor and has a substantially rectangular parallelepiped shape. In FIG. 1, a surface of the inductor 1 on a negative side of a Z-axis direction is a mounting surface 8*a*, which is disposed facing a circuit board or the like. Hereinafter, a surface of the inductor 1 that is opposite to the mounting surface 8*a* is referred to as a non-mounting surface 8*b*. In the drawing, an X-axis direction corresponds to a left-right direction of a core 8, an Y-axis direction corresponds to a front-rear direction of the core 8, and the Z-axis direction corresponds to an up-down direction of the core 8.

Figure 2:
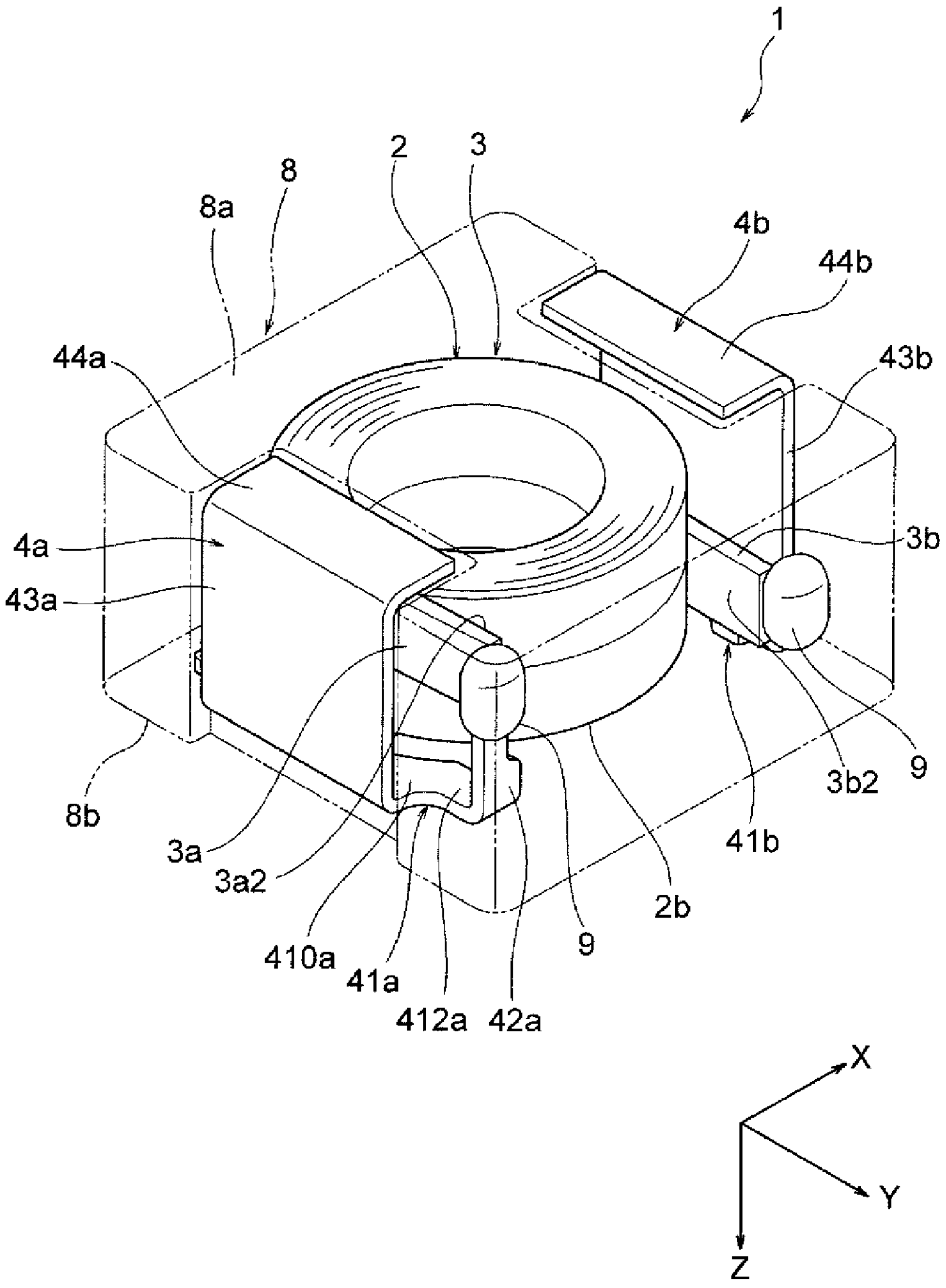
FIG. 2 is a perspective view showing an internal configuration of the coil device shown in FIG. 1.

As shown in FIG. 2, the inductor 1 includes a coil 2, a pair of terminals 4*a*, 4*b*, and the core (element body) 8. Note that FIG. 2 shows a state in which the inductor 1 shown in FIG. 1 is inverted in the up-down direction and the left-right direction. Therefore, the mounting surface 8*a* of the inductor 1 is disposed on an upper side of a paper surface, and the non-mounting surface 8*b* of the inductor 1 is disposed on a lower side of the paper surface.

In the following description, for ease of understanding, the upper side of the paper surface (the negative side of the Z-axis direction in FIG. 2) is defined as an upper side of the inductor 1, and the lower side of the paper surface (a positive side of the Z-axis direction in FIG. 2) is defined as a lower side of the inductor 1. A front side of the paper surface (a positive side of the Y-axis direction in FIG. 2) is defined as a front side of the inductor 1, and a back side of the paper surface (a negative side of the Y-axis direction in FIG. 2) is defined as a rear side of the inductor 1. A direction away from a center of the core 8 or the coil 2 is defined as outside, and a direction toward the center of the core 8 or the coil 2 is defined as inside.

Although dimensions of the inductor 1 are not particularly limited, a width thereof in the X-axis direction is preferably 2 to 20 mm, a width thereof in the Y-axis direction is preferably 2 to 20 mm, and a width thereof in the Z-axis direction is preferably 1 to 10 mm.

Figure 7A:
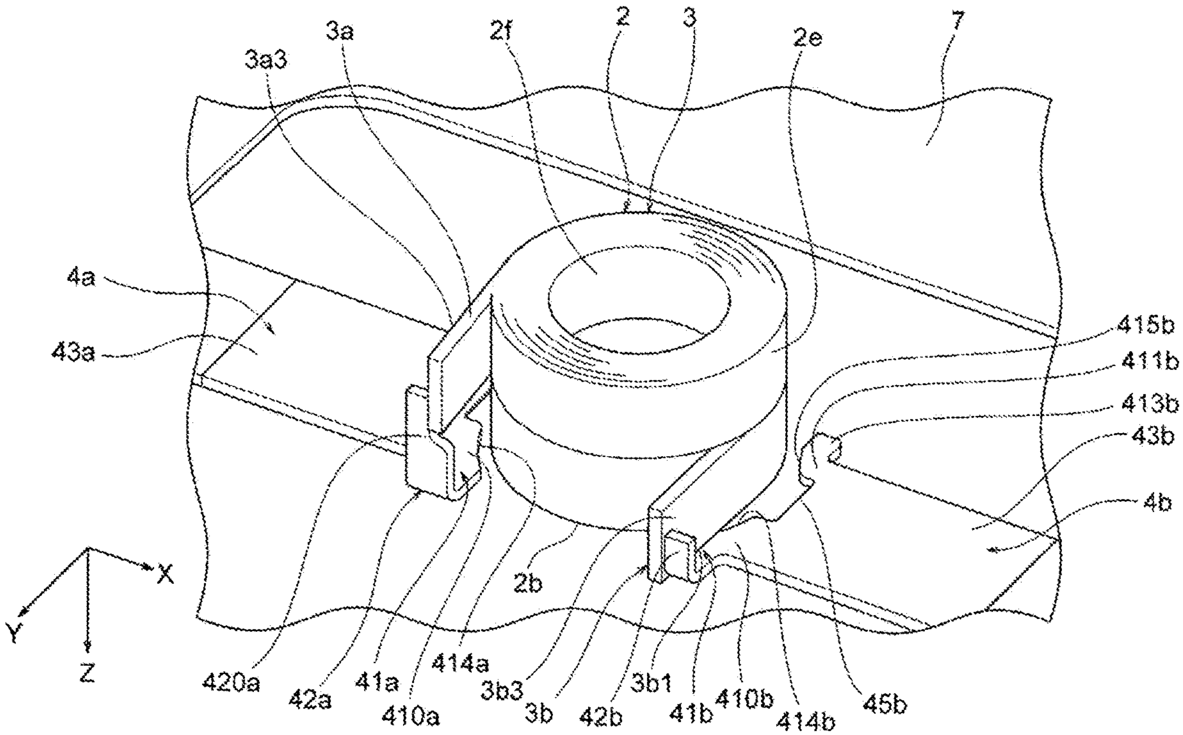
FIG. 7A is a diagram showing a method for manufacturing the coil device shown in FIG. 1.
Figure 7B:
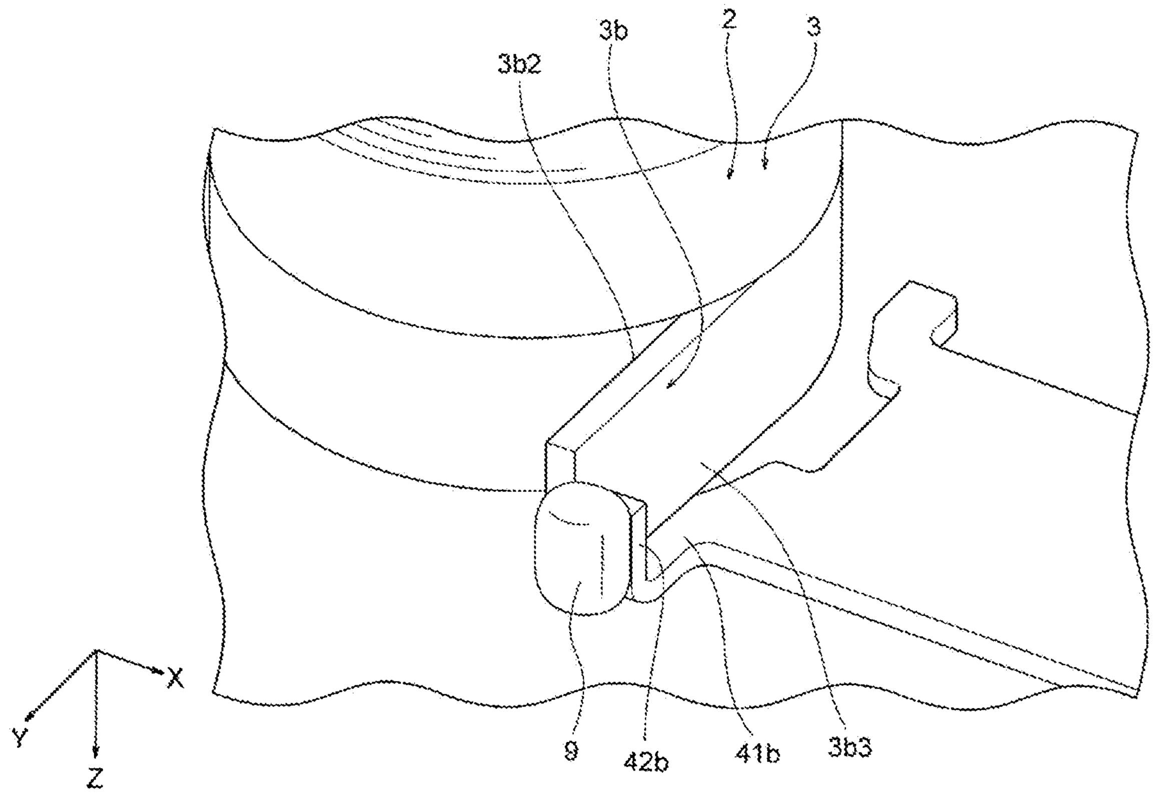
FIG. 7B is a diagram showing a step subsequent to FIG. 7A.
Figure 7C:
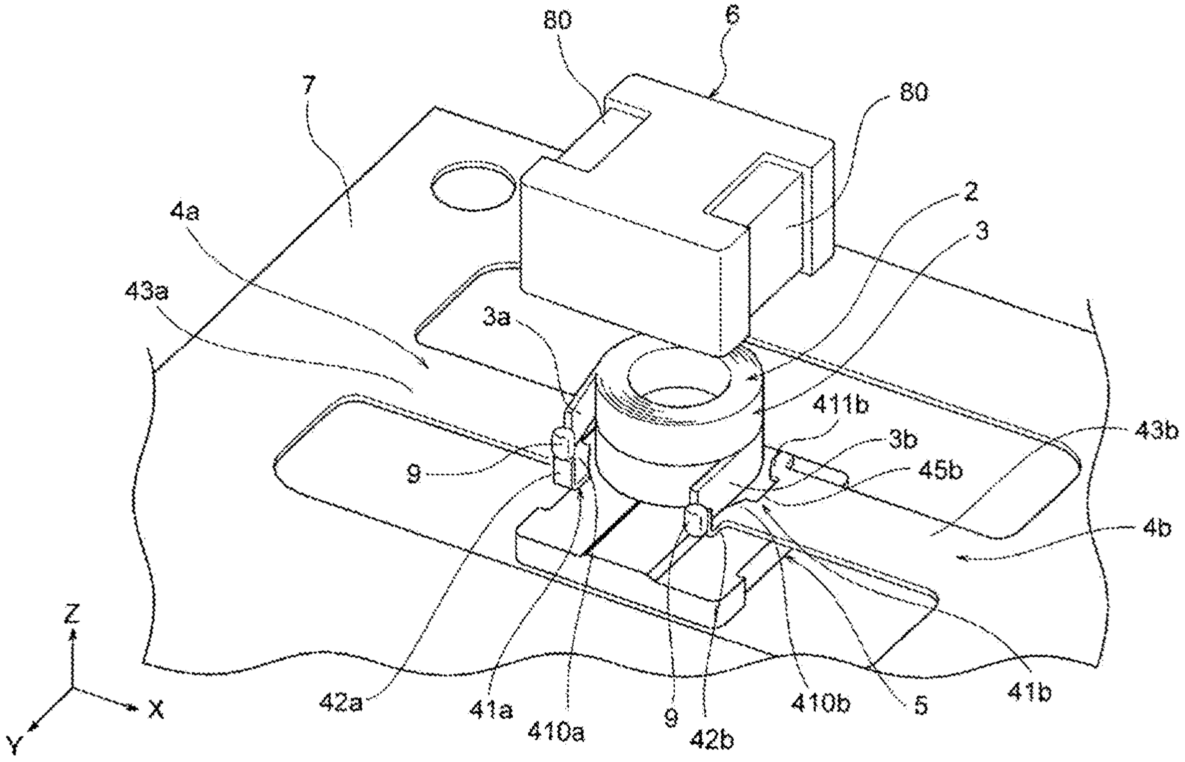
FIG. 7C is a diagram showing a step subsequent to FIG. 7B.

The core 8 is made of a mixture containing magnetic powder and binder resin, and is formed by combining a first core 5 and a second core 6 shown in FIG. 7C. That is, the core 8 is formed by compression-molding the previously molded first core 5 and second core 6 inside a mold and integrating the first core 5 and the second core 6. Note that a boundary between the first core 5 and the second core 6 cannot be identified, and the first core 5 and the second core 6 are completely integrated together.

The core 8 (the first core 5 and/or the second core 6) is made of synthetic resin in which ferrite particles or metal magnetic particles are dispersed. However, a material constituting the core 8 is not limited thereto, and the core 8 may be constituted by a synthetic resin that does not contain these particles. Examples of the ferrite particles include Ni—Zn ferrite and Mn—Zn ferrite. The metal magnetic particles are not particularly limited, and examples thereof include Fe—Ni alloy powder, Fe—Si alloy powder, Fe—Si—Cr alloy powder, Fe—Co alloy powder, Fe—Si—Al alloy powder, and amorphous iron.

The synthetic resin contained in the core 8 is not particularly limited, and preferable examples thereof include epoxy resin, phenol resin, polyester resin, polyurethane resin, polyimide resin, and silicone resin.

Figure 3:
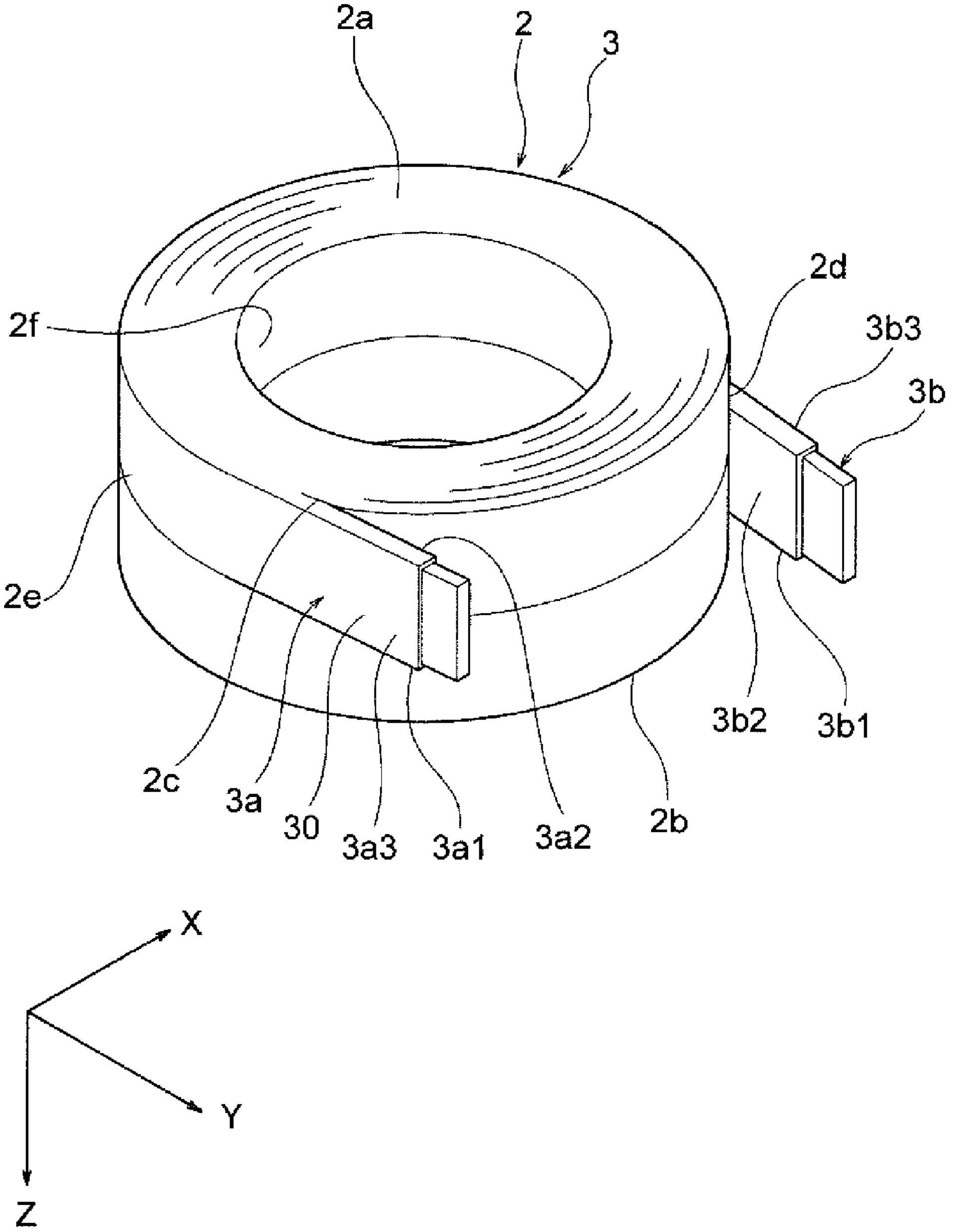
FIG. 3 is a perspective view of a coil shown in FIG. 2.

As shown in FIG. 3, the coil 2 is a flatwise coil. The coil 2 is formed by, for example, a-winding a wire 3 made of a flat wire, and includes two layers along the Z-axis direction. By forming the coil 2 with a flat wire, a relatively large current can flow through the coil 2, deformation of the coil 2 is unlikely to occur, and a high-quality inductor 1 can be obtained. Note that a winding method of the wire 3 is not limited to the a winding, and may be changed as appropriate.

A winding axis direction of the coil 2 corresponds to the Z-axis direction. The wire 3 is wound such that two relatively wide surfaces among four side surfaces constituting an outer surface of the flat wire face inner and outer peripheral sides of the coil 2. Note that the wire 3 may be wound such that two relatively narrow surfaces among the four side surfaces constituting the outer surface of the flat wire face the inner and outer peripheral sides of the coil 2, so as to form the coil 2, which is an edgewise coil.

The coil 2 is an air-cored coil, and as shown in FIG. 2, the coil 2 is embedded inside the core 8. The coil 2 is disposed inside the core 8 such that a thickness direction of lead portions 3*a*, 3*b* substantially coincides with the X-axis direction (the left-right direction of the core 8).

Examples of a material constituting the wire 3 include a good conductor of metal such as copper, copper alloys, silver, and nickel, but the material is not particularly limited as long as it is a conductive material. The wire 3 is an insulated coated wire, and an insulation coating 30 is formed on a surface of the wire 3. Resin constituting the insulation coating 30 is not particularly limited, but for example, a polyamide-imide resin, a urethane resin, or the like is used. As the wire 3, a self-welding wire including a welding coating outside the insulation coating may be used. Although the resin constituting the welding coating is not particularly limited, for example, a polyamide resin, an epoxy resin, or the like is used. The insulation coating 30 is removed from the wire 3 at positions of the lead portions 3*a*, 3*b* in order to establish electrical connection with the terminals 4*a*, 4*b*.

As shown in FIG. 3, in a second layer of the coil 2, the lead portion 3*a* of the wire 3 is led out of the coil 2 from a first lead-out position 2*c* positioned on an outer peripheral surface 2*e* of the coil 2 and extends along the Y-axis direction linearly. In a first layer of the coil 2, the lead portion 3*b* of the wire 3 is led out of the coil 2 from a second lead-out position 2*d* positioned on the outer peripheral surface 2*e* of the coil 2 and extends along the Y-axis direction linearly. The lead portions 3*a*, 3*b* are led out in the same direction (Y-axis direction) without being twisted or bent. The first lead-out position 2*c* and the second lead-out position 2*d* are displaced along the Z-axis direction, and the lead portions 3*a*, 3*b* are displaced along the Z-axis direction.

In the state shown in FIG. 3, the lead portions 3*a*, 3*b* are led out along the Y-axis direction, but when connected to the wire connecting portions 42*a*, 42*b*, the lead portions 3*a*, 3*b* are inclined inwardly with respect to the Y-axis.

Figure 4:
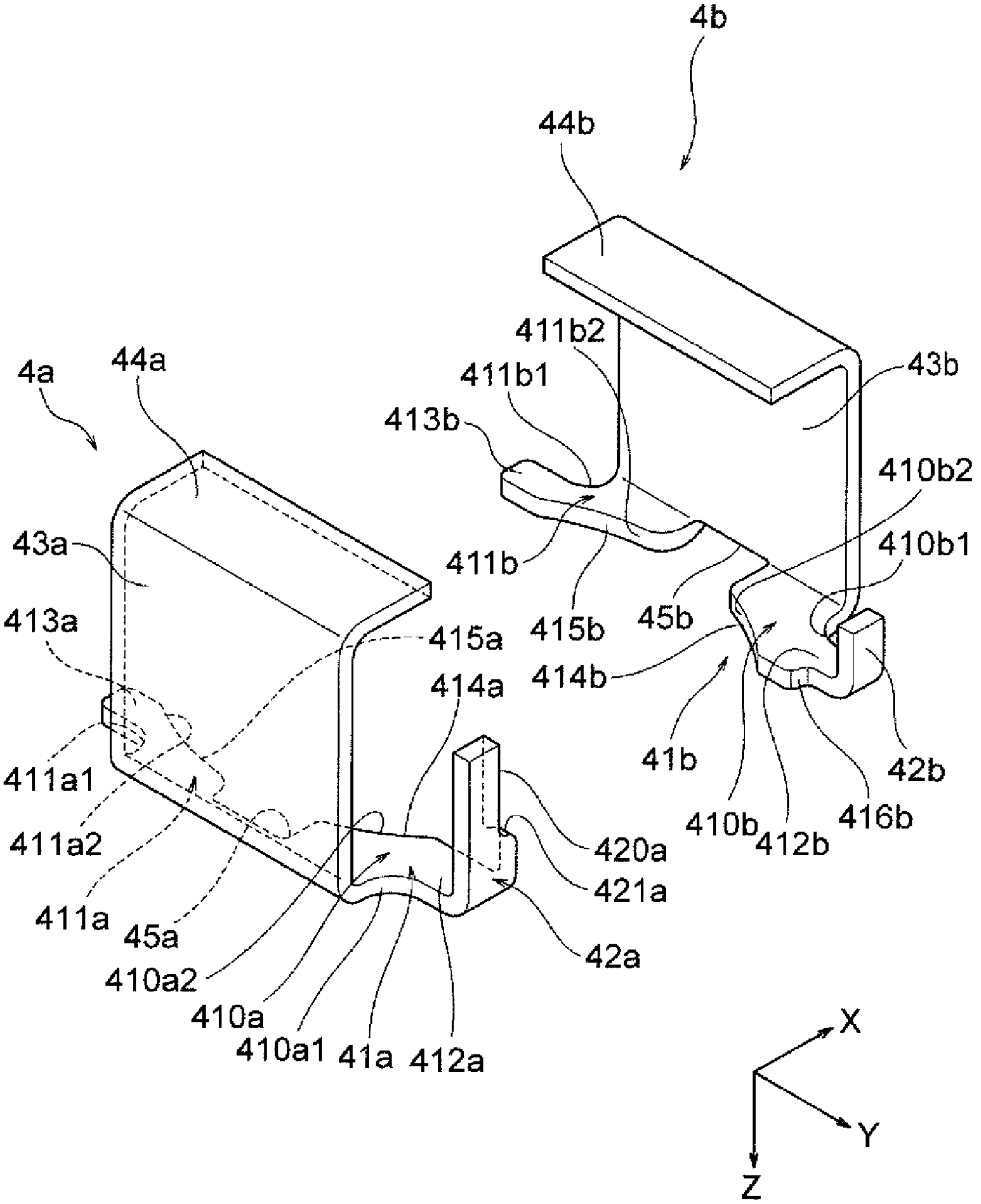
FIG. 4 is a perspective view of a pair of terminals shown in FIG. 2.

As shown in FIG. 4, the terminal 4*a* includes a base portion 41*a*, a wire connecting portion 42*a*, a connecting portion 43*a*, and a mounting portion 44*a*. The terminal 4*b* includes a base portion 41*b*, a wire connecting portion 42*b*, a connecting portion 43*b*, and a mounting portion 44*b*. The terminals 4*a*, 4*b* are formed by machining a conductive plate material such as metal.

Figure 5A:
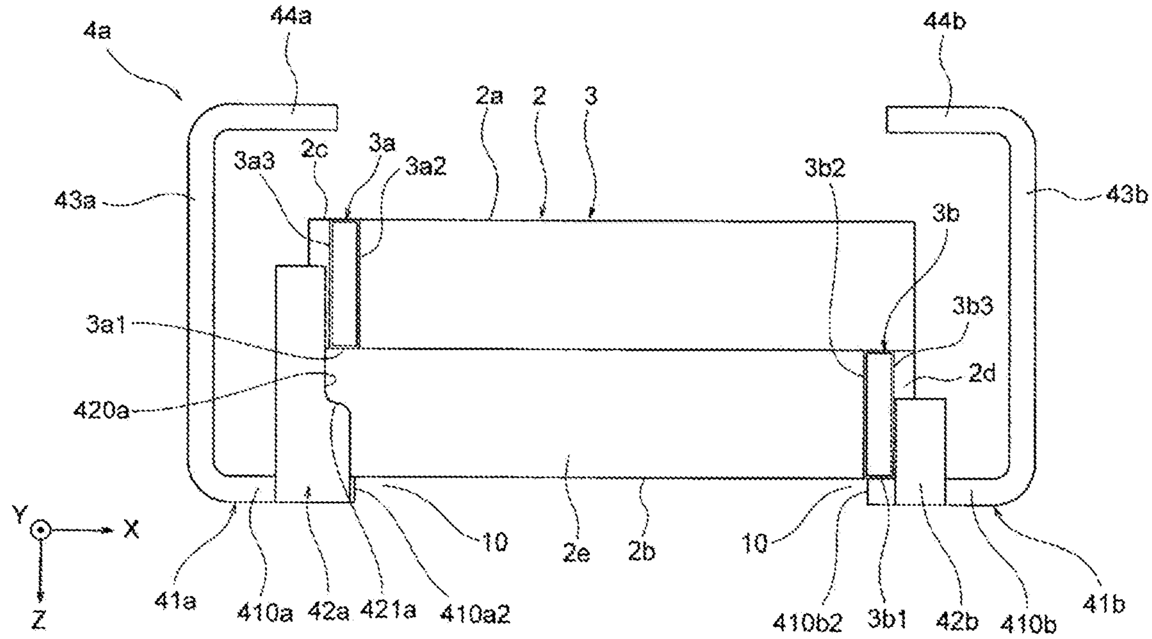
FIG. 5A is a side view showing a state in which a lead portion of the coil is connected to the pair of terminals shown in FIG. 4.

As shown in FIG. 5A, the base portions 41*a* and 41*b* are positioned at substantially the same height as a bottom surface 2*b* of the coil 2 and are arranged substantially parallel to the bottom surface (non-mounting surface 8*b*) of the core 8 shown in FIG. 2. In the present embodiment, upper surfaces of the base portions 41*a*, 41*b* and the bottom surface 2*b* of the coil 2 are positioned substantially on the same plane. The wire connecting portions 42*a*, 42*b* are formed integrally with the base portions 41*a*, 41*b*, and the base portions 41*a*, 41*b* exert an effect of holding the wire connecting portions 42*a*, 42*b*.

As shown in FIG. 4, the base portion 41*a* includes a main branch portion 410*a* and a sub branch portion 411*a*, and the base portion 41*b* includes a main branch portion 410*b* and a sub branch portion 411*b*. The base portions 41*a*, 41*b* both have a bifurcated shape and have a common shape except for a part. Since description of the base portion 41*a* (the main branch portion 410*a* and the sub branch portion 411*a*) is also applicable to the base portion 41*b* (the main branch portion 410*b* and the sub branch portion 411*b*), only particularly necessary matters will be explained for the latter.

The wire connecting portion 42*a* is connected to an end portion of the main branch portion 410*a* (more specifically, a main protruding portion 412*a*, which will be described later) on the positive side of the Y-axis direction, and the main branch portion 410*a* holds the wire connecting portion 42*a*. End portions of the main branch portion 410*a* and the sub branch portion 411*a* on the negative side of the X-axis direction are both connected to a lower end portion of the connecting portion 43*a*. The main branch portion 410*a* extends further outward in the Y-axis direction than an end portion of the connecting portion 43*a* on the positive side of the Y-axis direction, and the sub branch portion 411*a* extends further outward in the Y-axis direction than an end portion of the connecting portion 43*a* on the negative side of the Y-axis direction.

A groove portion 45*a* is formed between the main branch portion 410*a* and the sub branch portion 411*a*. The groove portion 45*a* forms a gap between the main branch portion 410*a* and the sub branch portion 411*a* so that the base portion 41*a* has a bifurcated shape.

The main branch portion 410*a* is positioned on the positive side of the Y-axis direction of the groove portion

45*a*, and the sub branch portion 411*a* is positioned on the negative side of the Y-axis direction of the groove portion 45*a*. Each of the main branch portion 410*a* and the sub branch portion 411*a* is bent in a substantially L shape as a whole. That is, the main branch portion 410*a* extends inward in the X-axis direction from a lower end portion of the connecting portion 43*a*, turns to the Y-axis direction, and extends toward the positive side of the Y-axis direction. The sub branch portion 411*a* extends inward in the X-axis direction from the lower end portion of the connecting portion 43*a*, turns to the Y-axis direction, and extends toward the negative side of the Y-axis direction.

Figure 6:
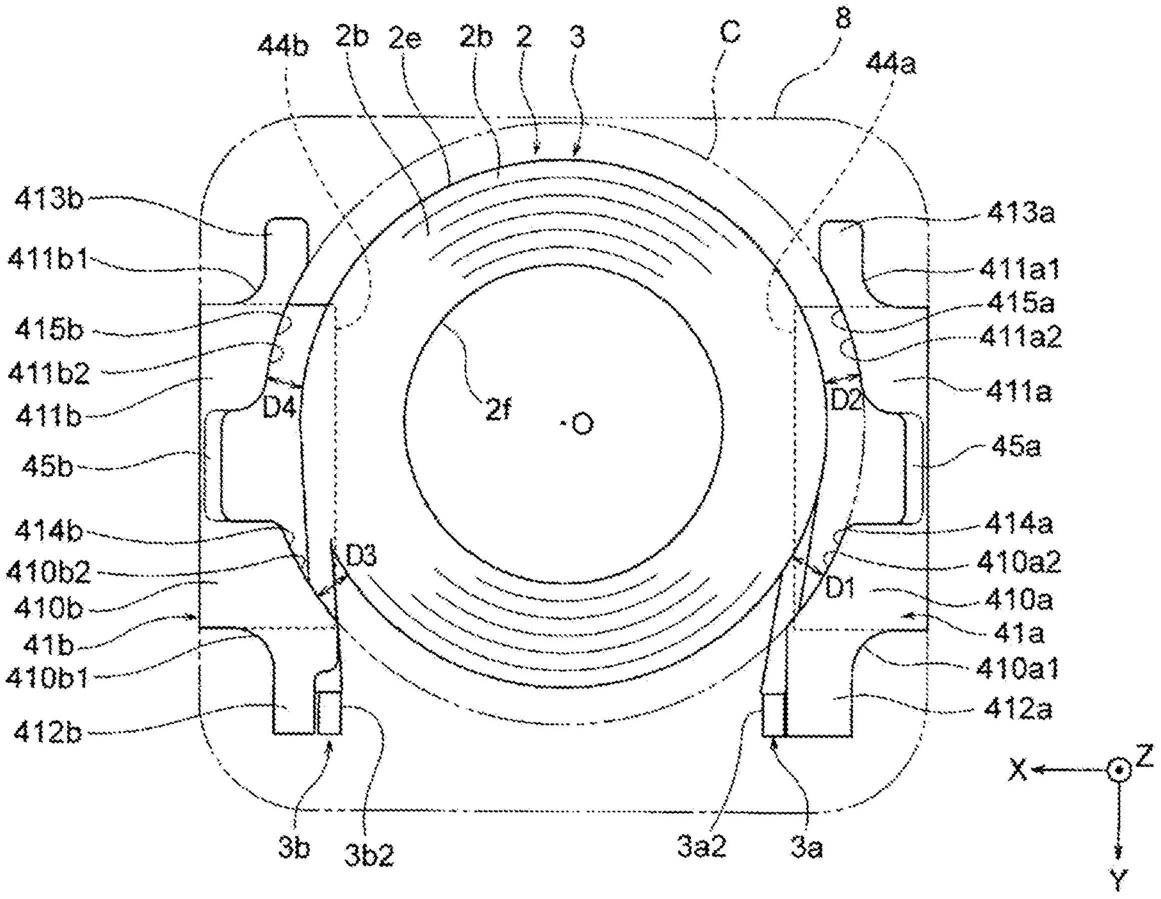
FIG. 6 is a plan view showing a state of the coil device shown in FIG. 2 when viewed from a bottom surface.

As shown in FIG. 6, inside the core 8, the main branch portion 410*a* and the sub branch portion 411*a* extend away from each other. That is, the main branch portion 410*a* extends so as to bend forward from a side of the core 8. The sub branch portion 411*a* extends so as to bend rearward from a side of the core 8. Note that the core 8 covers the coil 2 together with the wire connecting portion 42*a* and the base portion 41*a* (the main branch portion 410*a* and the sub branch portion 411*a*).

An outer edge 410*a*1 of the main branch portion 410*a* is smoothly curved forward from the side of the core 8 in line with an overall shape of the main branch portion 410*a*. An outer edge 411*a*1 of the sub branch portion 411*a* is smoothly curved rearward from the side of the core 8 in line with an overall shape of the sub branch portion 411*a*. A radius of curvature R1 of the outer edge 410*a*1 of the main branch portion 410*a* is different from a radius of curvature R2 of the outer edge 411*a*1 of the sub branch portion 411*a*. In the present embodiment, R1>R2, but R1<R2 is also possible.

By curving the outer edge 410*a*1 of the main branch portion 410*a* and the outer edge 411*a*1 of the sub branch portion 411*a*, the terminal 4*a* can be prevented from coming off from the core 8 and displacement of the base portion 41*a* in the core 8 can be prevented particularly in the left-right direction of the core 8 by an anchoring effect of the main branch portion 410*a* and the sub branch portion 411*a*. By making the radius of curvature of the outer edge 410*a*1 of the main branch portion 410*a* different from the radius of curvature of the outer edge 411*a*1 of the sub branch portion 411*a*, the main branch portion 410*a* and the sub branch portion 411*a* may be provided with a sufficient size to achieve the above effect, so that the above effect can be effectively obtained.

The main branch portion 410*a* includes the main protruding portion 412*a* that protrudes (extends) forward of the core 8. The sub branch portion 411*a* includes a sub protruding portion 413*a* that protrudes (extends) rearward of the core 8. The main branch portion 410*b* includes a main protruding portion 412*b* that protrudes forward of the core 8. The sub branch portion 411*b* includes a sub protruding portion 413*b* that protrudes rearward of the core 8.

The main protruding portion 412*a* is formed narrower than other portions of the main branch portion 410*a*, and the sub protruding portion 413*a* is formed narrower than other portions of the sub branch portion 411*a*. The sub branch portion 411*a* is formed narrower in the X-axis direction than the main branch portion 410*a*.

The main protruding portion 412*a* protrudes forward of the core 8 from the outer peripheral surface 2*e* of the coil 2 along the Y-axis direction. On the other hand, the sub protruding portion 413*a* protrudes rearward of the core 8 from an inner peripheral surface 2*f* of the coil 2 along the Y-axis direction, while does not protrude rearward of the core 8 from the outer peripheral surface 2*e* of the coil 2. That is, an end portion of the sub protruding portion 413*a* in the Y-axis direction is disposed between the inner peripheral surface 2*f* and the outer peripheral surface 2*e* of the coil 2 in the Y-axis direction.

One of the main protruding portion 412*a* and the sub protruding portion 413*a* is displaced with respect to the other along the X-axis direction of the core 8. In the present embodiment, the sub protruding portion 413*a* is displaced to the outside of the core 8 in the X-axis direction with respect to the main protruding portion 412*a*. That is, an inner edge of the sub protruding portion 413*a* is positioned more outside the core 8 than an inner edge of the main protruding portion 412*a*, and an outer edge of the sub protruding portion 413*a* is positioned more outside the core 8 than an outer edge of the main protruding portion 412*a*.

By providing the base portion 41*a* with the main protruding portion 412*a* and the sub protruding portion 413*a*, the terminal 4*a* can be prevented from coming off from the core 8 and displacement of the base portion 41*a* in the core 8 can be prevented particularly in the left-right direction of the core 8 by an anchoring effect of the main protruding portion 412*a* and the sub protruding portion 413*a*. By displacing one of the main protruding portion 412*a* and the sub protruding portion 413*a* relative to the other along the left-right direction of the core 8, an area occupied by the main protruding portion 412*a* and the sub protruding portion 413*a* inside the core 8 can be sufficiently ensured, so that the above effect can be effectively obtained.

As shown in FIG. 4, a main curved portion 414*a* is formed on an inner edge 410*a*2 of the main branch portion 410*a*, and a sub curved portion 415*a* is formed on an inner edge 411*a*2 of the sub branch portion 411*a*. A main curved portion 414*b* is formed on an inner edge 410*b*2 of the main branch portion 410*b*, and a sub curved portion 415*b* is formed on an inner edge 411*b*2 of the sub branch portion 411*b*.

The main curved portions 414*a*, 414*b* are mainly formed on parts of the main branch portions 410*a*, 410*b* excluding the main protruding portions 412*a*, 412*b*. The sub curved portions 415*a*, 415*b* are mainly formed on parts of the sub branch portions 411*a*, 411*b* excluding the sub protruding portions 413*a*, 413*b*.

A radius of curvature of the main curved portion 414*a*, a radius of curvature of the sub curved portion 415*a*, a radius of curvature of the main curved portion 414*b*, and a radius of curvature of the sub curved portion 415*b* are substantially equal to each other. These radiuses of curvature are approximately equal to a radius of curvature of an outer periphery (outer peripheral surface 2*e*) or an inner periphery (inner peripheral surface 2*f*) of the coil 2. Therefore, the main curved portions 414*a*, 414*b* and the sub curved portions 415*a*, 415*b* are curved along the outer peripheral surface 2*e* of the coil 2 at positions spaced from the outer peripheral surface 2*e* of the coil 2 by a predetermined distance.

As shown in FIG. 6, the inner edge 410*a*2 of the main branch portion 410*a* faces the outer peripheral surface 2*e* of the coil 2 with a predetermined gap D1 therebetween. The inner edge 411*a*2 of the sub branch portion 411*a* faces the outer peripheral surface 2*e* of the coil 2 with a predetermined gap D2 therebetween. The inner edge 410*b*2 of the main branch portion 410*b* faces the outer peripheral surface 2*e* of the coil 2 with a predetermined gap D3 therebetween. The inner edge 411*b*2 of the sub branch portion 411*b* faces the outer peripheral surface 2*e* of the coil 2 with a predetermined gap D4 therebetween. That is, none of the main branch portions 410*a*, 410*b* and the sub branch portions 411*a*, 411*b* are in contact with the coil 2, and are arranged around the outer peripheral surface 2*e* of the coil 2 so as to surround the outer peripheral surface 2*e* of the coil 2. In the present embodiment, the distance D1, the distance D2, the distance D3, and the distance D4 are substantially equal to each other on a virtual plane parallel to the bottom surface 2*b* of the coil 2 and the upper surfaces of the base portions 41*a*, 41*b*.

A center position of a virtual circle C defined by the main curved portion 414*a*, the sub curved portion 415*a*, the main curved portion 414*b*, and the sub curved portion 415*b* approximately coincides with a center position of the inner periphery (inner peripheral surface 2*f*) or the outer periphery (outer peripheral surface 2*e*) of the coil 2. That is, the virtual circle C and a virtual circle defined by the inner periphery (inner peripheral surface 2*f*) or the outer periphery (outer peripheral surface 2*e*) of the coil 2 are arranged concentrically.

As shown in FIG. 5A, the inner edge 410*a*2 of the main branch portion 410*a* is positioned outside an inner side surface 3*a*2 of the lead portion 3*a* in the X-axis direction. Although detailed illustration is omitted, the inner edge 411*a*2 (FIG. 4) of the sub branch portion 411*a* is similarly positioned outside the inner side surface 3*a*2 of the lead portion 3*a* in the X-axis direction. That is, the main branch portion 410*a* and the sub branch portion 411*a* do not protrude inwardly beyond the inner side surface 3*a*2 of the lead portion 3*a*.

The inner edge 410*b*2 of the main branch portion 410*b* is positioned outside an inner side surface 3*b*2 of the lead portion 3*b* in the X-axis direction. Although detailed illustration is omitted, the inner edge 411*b*2 (FIG. 4) of the sub branch portion 411*b* is similarly positioned outside the inner side surface 3*b*2 of the lead portion 3*b* in the X-axis direction. That is, the main branch portion 410*b* and the sub branch portion 411*b* do not protrude inwardly beyond the inner side surface 3*b*2 of the lead portion 3*b*.

A lead bottom portion 3*b*1 of the lead portion 3*b* led from a lower part (second lead-out position 2*d*) of the coil 2 is placed on an upper surface of the main branch portion 410*b* between the main branch portion 410*a* and the main branch portion 410*b*. As a result, the lead portion 3*b* is fixed to the main branch portion 410*b*, and during manufacture of the inductor 1 (during compression molding of the first core 5 and the second core 6 shown in FIG. 7C), positional displacement of the lead portion 3*b* (and the whole coil 2) due to applied pressure can be effectively prevented. Note that since the lead portion 3*a* of the wire 3 is led out from an upper part (first lead-out position 2*c*) of the coil 2, the lead portion 3*a* is not placed on an upper surface of the main branch portion 410*a*, and is disposed at a position spaced upward from the upper surface of the main branch portion 410*a*.

As shown in FIG. 4, only the main branch portion 410*b* between the main branch portion 410*a* and the main branch portion 410*b* is formed with a recess 416*b*. The recess 416*b* is formed on the inner edge 410*b*2 of the main branch portion 410*b*, and is positioned at a different position from the main curved portion 414*b* (forward than the main curved portion 414*b*). The recess 416*b* is provided to adjust (narrow) a width of the main protruding portion 412*b* and further of the wire connecting portion 42*b* in the X-axis direction.

Figure 5B:
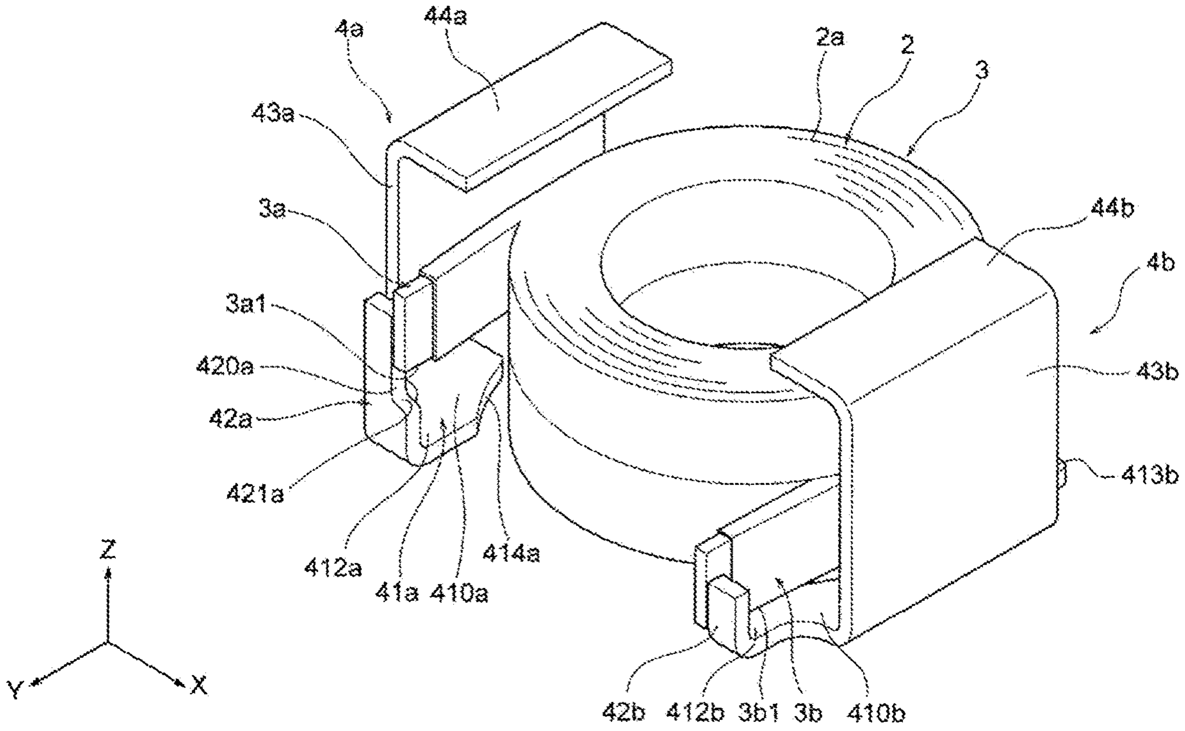
FIG. 5B is a perspective view showing a state of the pair of terminals and the coil shown in FIG. 5A when viewed from another angle.

The wire connecting portions 42*a*, 42*b* have a flat plate shape substantially parallel to an XZ plane, and are arranged substantially orthogonal to the lead portions 3*a*, 3*b* (see FIG. 5B). As shown in FIG. 2, the wire connecting portions 42*a*, 42*b* are arranged inside the core 8. The lead portions 3*a*, 3*b* of the wire 3 are connected to the wire connecting portions 42*a*, 42*b*. More specifically, the lead portion 3*a* is connected to the wire connecting portion 42*a* at a position spaced upward from the upper surface of the base portion 41*a*. The lead portion 3*b* is connected to the wire connecting portion 42*b* while being placed on the base portion 41*b*. In the present embodiment, since the lead portions 3*a* and 3*b* are led out in substantially the same direction (positive side of the Y-axis direction), the wire connecting portions 42*a*, 42*b* are arranged on the positive side of the Y-axis direction of the coil 2 from which the lead portions 3*a*, 3*b* are led out.

As shown in FIG. 4, the wire connecting portions 42*a*, 42*b* extend along the Z-axis direction and rise upward from the end portions on the positive side of the Y-axis direction of the main branch portions 410*a*, 410*b*. The wire connecting portions 42*a*, 42*b* are arranged substantially perpendicular to the main branch portions 410*a*, 410*b*. Rising positions of the wire connecting portions 42*a*, 42*b* are positioned forward of positions of the end portions of the connecting portions 43*a*, 43*b* on the positive side of the Y-axis direction. As shown in FIG. 2, the end portions of the base portions 41*a*, 41*b* on the positive side of the Y-axis direction are arranged outside the end portion of the coil 2 on the positive side of the Y-axis direction in the Y-axis direction, and therefore, the rising positions of the wire connecting portions 42*a*, 42*b* are positioned outside the end portion of the coil 2 on the positive side of the Y-axis direction in the Y-axis direction.

As shown in FIG. 5A, a length of the wire connecting portion 42*a* in the Z-axis direction is longer than a length of the wire connecting portion 42*b* in the Z-axis direction. The length of the wire connecting portion 42*a* in the Z-axis direction is longer than a length of the wire 3 in the Z-axis direction, and an upper end portion of the wire connecting portion 42*a* is disposed at a position corresponding to the second layer of the coil 2 (first lead-out position 2*c*). Therefore, when the lead portion 3*a* is led out from the first lead-out position 2*c*, the lead portion 3*a* can be led out to the position of the wire connecting portion 42*a* and connected thereto without being bent unnecessarily.

The length of the wire connecting portion 42*b* in the Z-axis direction is smaller than the length of the wire 3 in the Z-axis direction, and the upper end portion of the wire connecting portion 42*b* is disposed at a position corresponding to the first layer of the coil 2 (second lead-out position 2*d*). Therefore, the position of the upper end portion of the wire connecting portion 42*a* and the position of the upper end portion of the wire connecting portion 42*b* are displaced from each other along the Z-axis direction.

In this way, since the positions (heights) of the wire connecting portions 42*a*, 42*b* are adjusted to match positions (heights) of the lead-out positions 2*c*, 2*d*, the lead portions 3*a*, 3*b* can be led out to the positions of the wire connecting portions 42*a*, 42*b* and connected thereto without being bent unnecessarily.

As shown in FIG. 6, a position of a center O of the coil 2 is displaced along the Y-axis direction from a center of the core 8 to a side opposite to the wire connecting portions 42*a*, 42*b* (to a rear side of the core 8). By adopting such a configuration, it is possible to ensure a sufficient volume of the core 8 in front of the core 8. Therefore, the wire connecting portions 42*a*, 42*b* and the lead portions 3*a*, 3*b* connected thereto can be covered with a sufficient amount of the core 8 to protect the wire connecting portions 42*a*, 42*b* and the lead portions 3*a*, 3*b*. Since a sufficient space is formed in front of the core 8 for arranging the wire connecting portions 42*a*, 42*b*, there is no need to expand the core 8 forward to ensure the space, and the inductor 1 can be miniaturized.

It is possible to dispose the outer peripheral surface 2*e* of the coil 2 at a position sufficiently spaced from a side surface of the core 8 on the positive side of the Y-axis direction, ensure a sufficient thickness of the core 8 between the outer peripheral surface 2*e* of the coil 2 and the side surface of the core 8 on the positive side of the Y-axis direction, and prevent cracks from occurring on the side surface of the core 8 on the positive side of the Y-axis direction.

As shown in FIG. 5A, when the core 8 is viewed from a front side, at least a part of the lead portion 3*a* is positioned inside in the X-axis direction of the first lead-out position 2*c* on the outer peripheral surface 2*e* of the coil 2 where the lead portion 3*a* is led out. At least a part of the lead portion 3*b* is positioned inside in the X-axis direction of the second lead-out position 2*d* on the outer peripheral surface 2*e* of the coil 2 from which the lead portion 3*b* is led out. By adopting such a configuration, an elastic force that tries to return the lead portion 3*a* to the first lead-out position 2*c* (outside the X-axis direction) acts on the lead portion 3*a*, so that the lead portion 3*a* is fixed to the wire connecting portion 42*a* in a biased state. Similarly, an elastic force that tries to return the lead portion 3*b* to the second lead-out position 2*d* (outside the X-axis direction) acts on the lead portion 3*b*, so that the lead portion 3*b* is fixed to the wire connecting portion 42*b* in a biased state. Therefore, the connection between the lead portion 3*a* and the wire connecting portion 42*a* can be maintained satisfactorily, and the connection between the lead portion 3*b* and the wire connecting portion 42*b* can be maintained satisfactorily.

A notch portion 420*a* is formed along the Z-axis direction in an inner edge of the wire connecting portion 42*a* between the wire connecting portion 42*a* and the wire connecting portion 42*b*. The notch portion 420*a* is cut downward at a predetermined depth from an upper end of the wire connecting portion 42*a*. The lead portion 3*a* of the wire 3 can be fixed to the notch portion 420*a*.

A length of the notch portion 420*a* in the Z-axis direction is substantially the same as the length of the wire 3 in the Z-axis direction. As shown in FIG. 5A, the lead bottom portion 3*a*1 of the lead portion 3*a* is fixed at a position spaced upward from a notch bottom portion 421*a* and does not contact the notch bottom portion 421*a*. Therefore, when the lead portion 3*a* is fixed to the notch portion 420*a*, the upper end portion of the lead portion 3*a* protrudes above the upper end of the wire connecting portion 42*a*, and the lead portion 3*a* is entirely accommodated inside the notch portion 420*a*.

In this way, by fixing the lead portion 3*a* at a position spaced upward from the notch bottom portion 421*a*, even if the first lead-out position 2*c* of the lead portion 3*a* changes along the Z-axis direction, the lead portion 3*a* does not come into contact with the notch bottom portion 421*a*, and the lead portion 3*a* can be reliably fixed to the notch portion 420*a*. When connecting the lead portion 3*a* to the wire connecting portion 42*a*, the lead portion 3*a* can be fixed to the notch portion 420*a* in a state of being straightly led out without being bent.

Note that an upper end portion of the lead portion 3*b* also protrudes above the upper end of the wire connecting portion 42*b*, similarly to the upper end portion of the lead portion 3*a*. This is because the length of the wire connecting portion 42*b* in the Z-axis direction is smaller than the length of the wire 3 in the Z-axis direction due to the miniaturization of the wire connecting portion 42*b*.

An outer side surface 3*a*3 (more specifically, a part or most of the outer side surface 3*a*3) of the lead portion 3*a* is connected to the inner edge of the wire connecting portion 42*a*, and an outer side surface 3*b*3 (more specifically, a part or most of the outer side surface 3*a*3) of the lead portion 3*b* is connected to an inner edge of the wire connecting portion 42*b*. The inner side surface 3*a*2 of the lead portion 3*a* is not fixed to the wire connecting portion 42*a*, and the inner side surface 3*b*2 of the lead portion 3*b* is not fixed to the wire connecting portion 42*b*.

With respect to the X-axis direction, a position of the outer side surface 3*a*3 of the lead portion 3*a* is positioned more inside than a position of the outer peripheral surface 2*e* of the coil 2 at the first lead-out position 2*c*. Therefore, with respect to the X-axis direction, the inner edge of the wire connecting portion 42*a* is positioned between the outer side surface 3*a*3 of the lead portion 3*a* and the outer peripheral surface 2*e* at the first lead-out position 2*c*. With respect to the X-axis direction, the position of the outer side surface 3*b*3 of the lead portion 3*b* is positioned more inside than the position of the outer peripheral surface 2*e* of the coil 2 at the second lead-out position 2*d*. Therefore, the inner edge of the wire connecting portion 42*b* is positioned between the outer side surface 3*b*3 of the lead portion 3*b* and the outer peripheral surface 2*e* at the second lead-out position 2*d* with respect to the X-axis direction.

In the present embodiment, the wire connecting portion 42*a* is positioned biased outward of the lead portion 3*a* that is led out forward of the core 8 in the X-axis direction. Similarly, the wire connecting portion 42*b* is positioned biased outward of the lead portion 3*b* that is led out forward of the core 8 in the X-axis direction. More specifically, the inner edge of the wire connecting portion 42*a* is positioned outside the inner side surface 3*a*2 of the lead portion 3*a* in the X-axis direction. The inner edge of the wire connecting portion 42*a* is positioned outside the outer side surface 3*a*3 of the lead portion 3*a* in the X-axis direction at the position of the notch portion 420*a*. The inner edge of the wire connecting portion 42*b* is positioned outside the inner side surface 3*b*2 and the outer side surface 3*b*3 of the lead portion 3*b* in the X-axis direction. That is, the wire connecting portions 42*a*, 42*b* do not protrude inward in the X-axis direction beyond the inner side surfaces 3*a*2, 3*b*2 of the lead portions 3*a*, 3*b*, and the entire wire connecting portions 42*a*, 42*b* are arranged outside the inner side surfaces 3*a*2, 3*b*2 in the X-axis direction.

As shown in FIG. 2, the lead portions 3*a*, 3*b* are connected to wire connecting portions 42*a*, 42*b* via a melted portion 9. The melted portion 9 is constituted by a weld bead formed when the terminals 4*a*, 4*b* (the wire connecting portions 42*a*, 42*b*) are irradiated with a laser. Here, the melted portion 9 may be a connection member made of solder, a conductive adhesive, or the like. In the wire connecting portion 42*a*, the melted portion 9 is unevenly distributed outside the inner side surface 3*a*2 of the lead portion 3*a* in the X-axis direction. In the wire connecting portion 42*b*, the melted portion 9 is unevenly distributed outside the inner side surface 3*b*2 of the lead portion 3*b* in the X-axis direction. That is, the melted portion 9 does not substantially protrude (is not formed) inside the inner side surfaces 3*a*2, 3*b*2 of the lead portions 3*a*, 3*b* in the X-axis direction, and the entire melted portion 9 is substantially disposed outside the inner side surfaces 3*a*2, 3*b*2 in the X-axis direction.

As shown in FIG. 4, the connecting portions 43*a*, 43*b* include surfaces substantially parallel to a YZ plane and extend upward from the base portions 41*a*, 41*b*. As shown in FIG. 2, the connecting portions 43*a*, 43*b* are exposed on side surfaces of the core 8 in the X-axis direction at a position spaced upward from the non-mounting surface 8*b* of the core 8, and extend to the position of the mounting surface 8*a* of the core 8 along the side surface. Although not shown in detail, part of the groove portions 45*a*, 45*b* (FIG.

1) extends to the lower end portions of the connecting portions 43*a*, 43*b*, and the groove portions 45*a*, 45*b* are exposed on the side surfaces of the core 8 in the X-axis direction.

As shown in FIG. 4, the mounting portions 44*a*, 44*b* are connected to end portions of the connecting portions 43*a*, 43*b* in the Z-axis direction and extend inward in the X-axis direction. The mounting portions 44*a*, 44*b* include surfaces parallel to an XY plane and are formed along the mounting surface 8*a* of the core 8 shown in FIG. 2. The mounting portions 44*a*, 44*b* are exposed to the outside of the core 8 on the mounting surface 8*a*, and are connected to a circuit board or the like (not shown) when the inductor 1 is mounted.

The mounting portions 44*a*, 44*b* are connected to a circuit board or the like via a connection member such as solder or a conductive adhesive. In this case, solder fillets can be formed in the connecting portions 43*a*, 43*b*, so that a mounting strength of the inductor 1 on the circuit board or the like can be increased.

Next, a method for manufacturing the inductor 1 will be described with reference to FIGS. 7A to 7F and the like. In the method of the present embodiment, first, a conductive plate such as a metal plate (for example, a Sn-plated metal plate) is punched into a shape as shown in FIG. 7A or 7C. As shown in the same drawing, the terminals 4*a*, 4*b* connected to a frame 7 via the connecting portions 43*a*, 43*b* are formed on the conductive plate after punching. In the frame 7, the terminals 4*a* and 4*b* are arranged with a predetermined interval therebetween along the X-axis direction.

Next, as shown in FIG. 7A, the coil 2 is disposed between the terminal 4*a* and the terminal 4*b*. In this case, the coil 2 is disposed at a position spaced from the terminals 4*a*, 4*b* by a predetermined distance (distances D1 to D4 shown in FIG. 6) such that a gap is formed between the main branch portions 410*a*, 410*b* (curved portions 414*a*, 415*a*) and sub branch portions 411*a*, 411*b* (curved portions 414*b*, 415*b*) of the terminals 4*a*, 4*b* and the outer peripheral surface 2*e* of the coil 2. It is preferable to fix the bottom surface 2*b* of the coil 2 on a pedestal (a pedestal having the same thickness as the terminals 4*a*, 4*b*) so that the bottom surface 2*b* of the coil 2 and the upper surfaces of the main branch portions 410*a*, 410*b* and the sub branch portions 411*a*, 411*b* are arranged substantially on the same plane. In order to prevent the coil 2 from being displaced, it is preferable to fix the inner peripheral surface 2*f* of the coil 2 with a positioning pin or the like.

When disposing the coil 2, the outer surface 3*a*3 of the lead portion 3*a* of the wire 3 is fixed to the inner edge (notch portion 420*a*) of the wire connecting portion 42*a*, and the wire connecting portion 42*a* is arranged outside the outer side surface 3*a*3 in the X-axis direction. The outer side surface 3*b*3 of the lead portion 3*b* of the wire 3 is fixed to the inner edge of the wire connecting portion 42*b*, and the wire connecting portion 42*b* is disposed outside the outer side surface 3*b*3 in the X-axis direction. The lead portion 3*b* of the wire 3 is placed on the main branch portion 410*b* so that the lead bottom portion 3*b*1 contacts the upper surface of the main branch portion 410*b*.

Next, as shown in FIG. 7B, the wire connecting portions 42*a*, 42*b* are irradiated with laser to form the melted portion 9 on the wire connecting portions 42*a*, 42*b*. As a result, the lead portions 3*a*, 3*b* are connected to the wire connecting portions 42*a*, 42*b* via the melted portion 9 (see FIG. 2). In the present embodiment, since the lead portions 3*a*, 3*b* are led out to substantially the same direction along the Y-axis direction, laser irradiation can be performed on the lead portions 3*a*, 3*b* from the same direction, thereby facilitating laser welding. Note that the laser irradiation is preferably performed so that the melted portion 9 does not protrude inward in the X-axis direction to the inner side surfaces 3*a*2, 3*b*2 of the lead portions 3*a*, 3*b*.

Figure 7D:
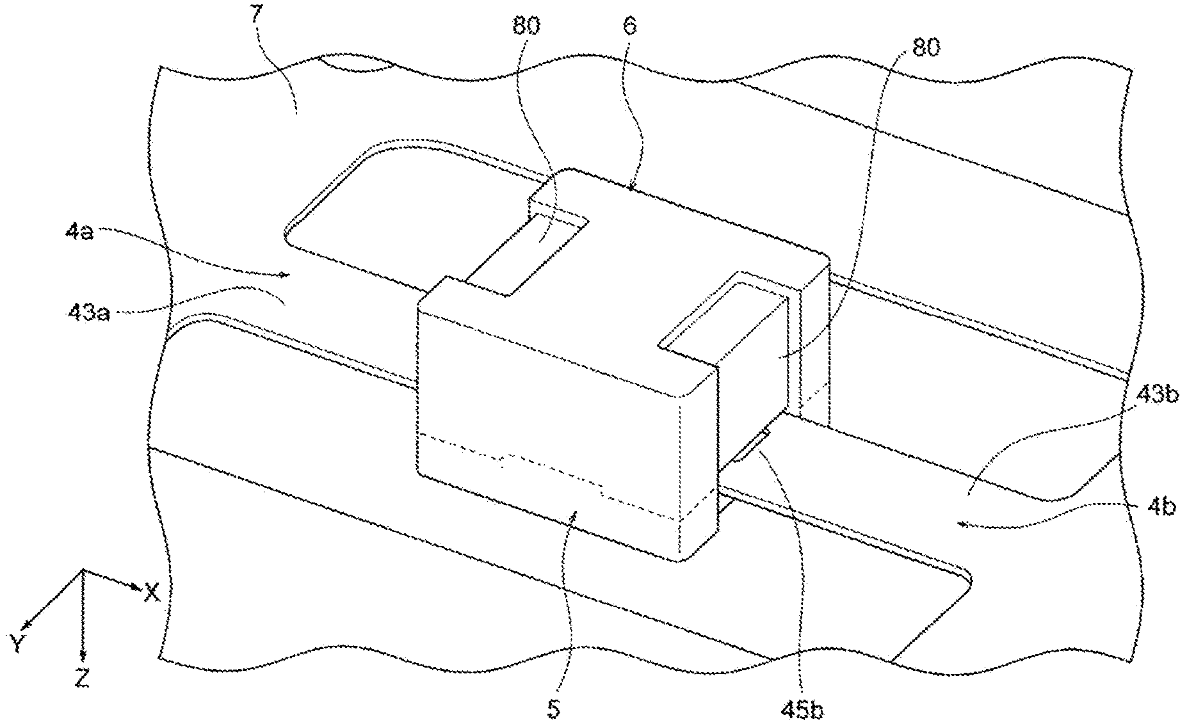
FIG. 7D is a diagram showing a step subsequent to FIG. 7C.

Next, the coil 2 in which the terminals 4*a*, 4*b* are fixed to each end portion respectively is disposed inside the mold, and the coil 2 is combined with the first core 5 and the second core 6 as shown in FIG. 7C to constitute a temporary assembly shown in FIG. 7D. More specifically, the coil 2 and the base portions 41*a*, 41*b* of the terminals 4*a*, 4*b* are placed on an upper surface of the first core 5. The connecting portions 43*a*, 43*b* of the terminals 4*a*, 4*b* are exposed from the first core 5 and the second core 6, respectively. Pre-molded cores (temporary molded cores) are used as the first core 5 and the second core 6. As a material constituting the first core 5 and the second core 6, a fluid material is used, and a composite magnetic material with a thermoplastic resin or a thermosetting resin as a binder is used.

The first core 5 and the second core 6 of the temporary assembly shown in FIG. 7D are compression-molded using mold jigs (upper and lower punches and the like), and by integrating the first core 5 and the second core 6, the core 8 (FIG. 7E) is formed. In this case, by applying heat, the first core 5 and the second core 6 can be easily integrated.

Figure 7E:
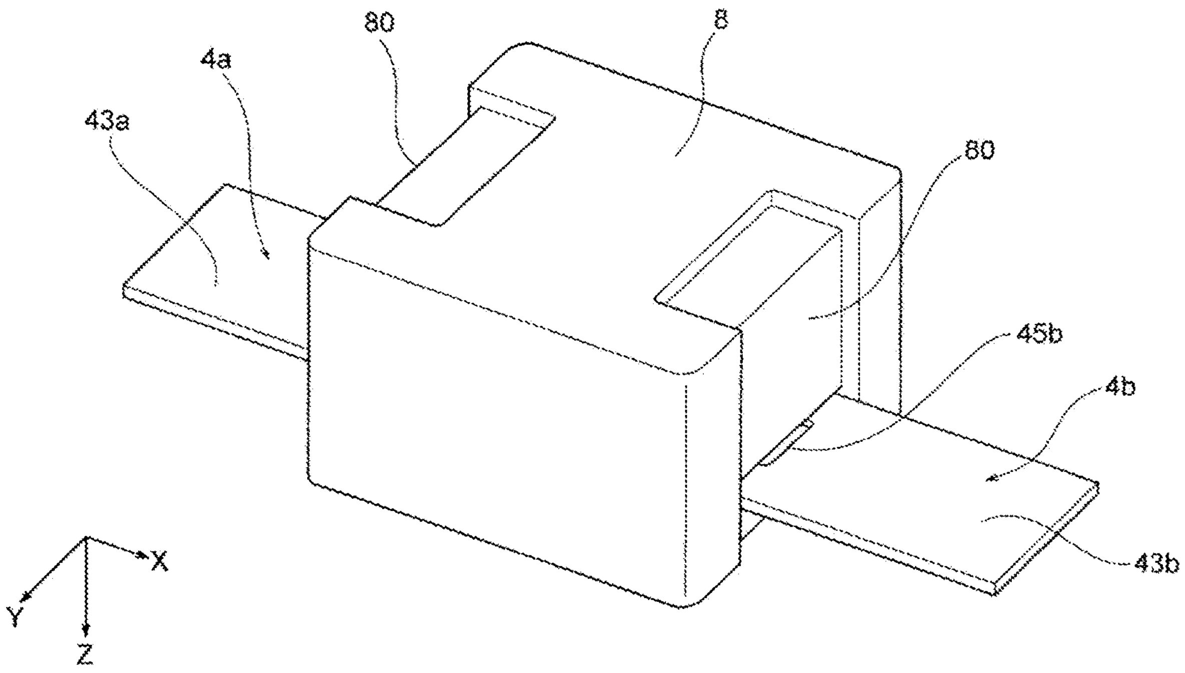
FIG. 7E is a diagram showing a step subsequent to FIG. 7D.
Figure 7F:
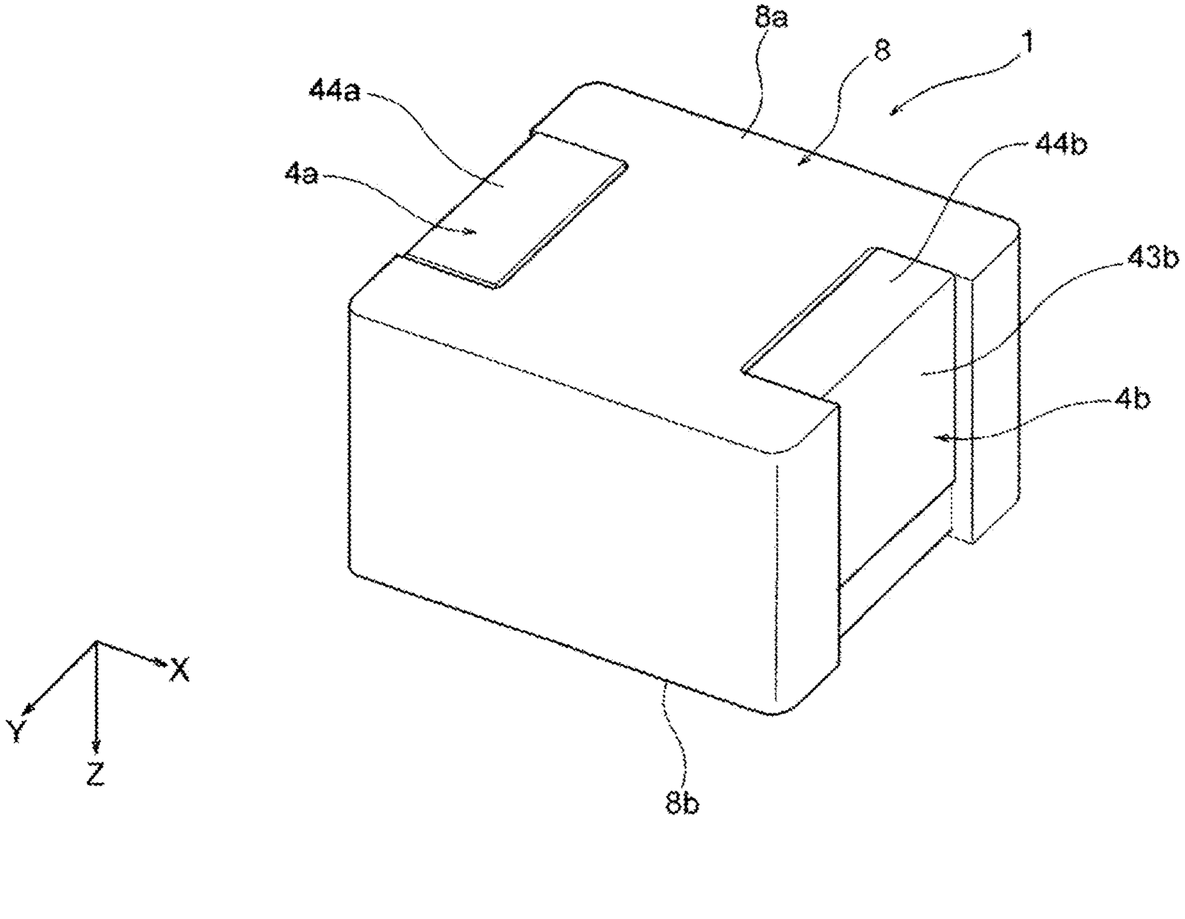
FIG. 7F is a diagram showing a step subsequent to FIG. 7E.

Next, as shown in FIG. 7E, the frame 7 shown in FIG. 7D is cut and removed with a cutting tool so that only the connecting portions 43*a*, 43*b* remain. Then, the connecting portions 43*a*, 43*b* are fixed to side recesses 80 formed in the core 8. More specifically, as shown in FIG. 7F, the connecting portions 43*a*, 43*b* of the terminals 4*a*, 4*b* are bent substantially vertically from the state shown in FIG. 7E, and the connecting portions 43*a*, 43*b* are fixed to the side recesses 80 respectively from sides of the core 8 in the X-axis direction. In this state, the end portions of the connecting portions 43*a*, 43*b* are bent substantially vertically and fixed to end portions of the side recesses 80, respectively, which extend to the mounting surface 8*a* of the core 8. As a result, the mounting portions 44*a*, 44*b* of the terminals 4*a*, 4*b* are formed on the mounting surface 8*a* of the core 8. As described above, the inductor 1 in the present embodiment can be obtained.

As shown in FIG. 5A, in the inductor 1 of the present embodiment, the wire connecting portions 42*a*, 42*b* are positioned outside the lead portions 3*a*, 3*b* along the X-axis direction. Therefore, the wire connecting portions 42*a*, 42*b* do not significantly protrude inside the lead portions 3*a*, 3*b* (the space 10 sandwiched between the lead portion 3*a* and the outer peripheral surface 2*e* of the coil 2/the space 10 sandwiched between the lead portion 3*b* and the outer peripheral surface 2*e* of the coil 2 shown in FIG. 5A), and when the space 10 inside the lead portions 3*a*, 3*b* is filled with the core 8, the wire connecting portion 42*a*, 42*b* do not become physical obstacles to this filling. Therefore, it is possible to fill the space 10 inside the lead portions 3*a*, 3*b* with a sufficient amount of the core 8 without being obstructed by the wire connecting portions 42*a*, 42*b*, and the density of the core 8 can be sufficiently secured, and the inductor 1 having good inductance characteristics can be obtained.

During compression molding, the space 10 inside the lead portions 3*a*, 3*b* can be easily filled with a sufficient amount of the core 8 without using high-pressure molding, and it is possible to prevent occurrence of defects such as deformation of the coil 2 and obtain a high-quality inductor 1.

By using the outer surfaces 3*a*3, 3*b*3 of the lead portions 3*a*, 3*b* as connecting surfaces with the wire connecting portions 42*a*, 42*b* and connecting the outer surfaces 3*a*3, 3*b*3 to the inner edges of the wire connecting portions 42*a*, 42*b*, it is possible to effectively prevent the wire connecting portions 42*a*, 42*b* from protruding into the space 10 inside the lead portions 3*a*, 3*b*. Accordingly, formation of physical obstacles that obstruct the filling of the core 8 in the space 10 inside the lead portions 3*a*, 3*b* can be prevented, and the space can be easily filled with a sufficient amount of the core 8.

As shown in FIG. 2, the melted portion 9 is unevenly distributed outside the lead portions 3*a*, 3*b* in the X-axis direction, so that the melted portion 9 does not significantly protrude into the space 10 inside the lead portions 3*a*, 3*b*, and when the space 10 inside the lead portions 3*a*, 3*b* is filled with the core 8, the melted portion 9 does not become a physical obstacle to this filling. Therefore, the space 10 inside the lead portions 3*a*, 3*b* can be easily filled with a sufficient amount of the core 8 without being obstructed by the melted portion 9.

In addition, as shown in FIG. 6, the inner edges 410*a*2, 411*a*2 of the base portion 41*a* (the main branch portion 410*a* and the sub branch portion 411*a*) are positioned outside the inner surface 3*a*2 of the lead portion 3*a* in the X-axis direction. The inner edges 410*b*2, 411*b*2 of the base portion 41*b* (the main branch portion 410*b* and the sub branch portion 411*b*) are positioned outside the inner surface 3*b*2 of the lead portion 3*b* in the X-axis direction. Therefore, a part of the base portion 41*a* does not protrude significantly into the space 10 inside the lead portions 3*a*, 3*b*, and when the space 10 inside the lead portions 3*a*, 3*b* is filled with the core 8, the base portions 41*a*, 41*b* do not become physical obstacles to this filling. Therefore, it is possible to fill the space 10 inside the lead portions 3*a*, 3*b* with a sufficient amount of the core 8 without being obstructed by the base portions 41*a*, 41*b*, and the density of the core 8 can be sufficiently secured, and the inductor 1 having good inductance characteristics can be obtained.

As shown in FIG. 5A, the notch portion 420*a* is formed on the inner edge of the wire connecting portion 42*a*, and the lead portion 3*a* is fixed at a position spaced upward from the notch bottom portion 421*a* of the notch portion 420*a*. By forming the notch portion 420*a* for fixing the lead portion 3*a* on the inner edge of the wire connecting portion 42*a*, it is possible to reduce the size of the wire connecting portion 42*a*, and it is possible to effectively prevent the wire connecting portion 42*a* from protruding into the space 10 inside the lead portion 3*a*. By fixing the lead portion 3*a* to the notch portion 420*a*, it is possible to prevent the lead portion 3*a* itself from protruding significantly toward a center of the coil 2, and formation of an area that is difficult to be filled with the core 8 can be effectively prevented in the space 10 inside the lead portion 3*a*.

Second Embodiment

Figure 8:
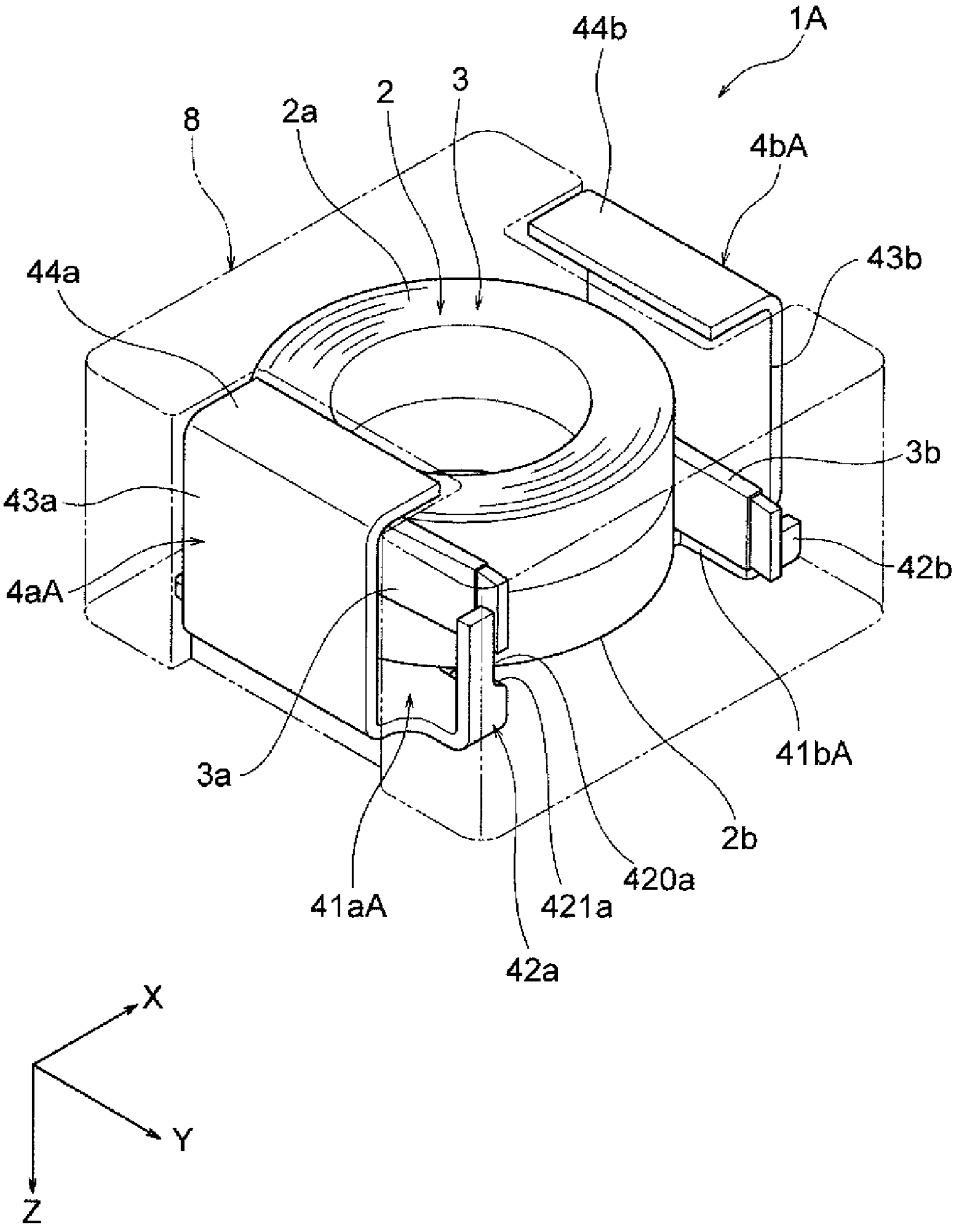
FIG. 8 is a perspective view of a coil device according to a second embodiment of the present invention.

An inductor 1A according to a second embodiment of the present invention shown in FIG. 8 has the same configuration as the inductor 1 according to the first embodiment except for the following points. In FIG. 8, members that are the same as those in the inductor 1 according to the first embodiment are denoted by the same reference numerals, and detailed description thereof will be omitted.

Figure 9:
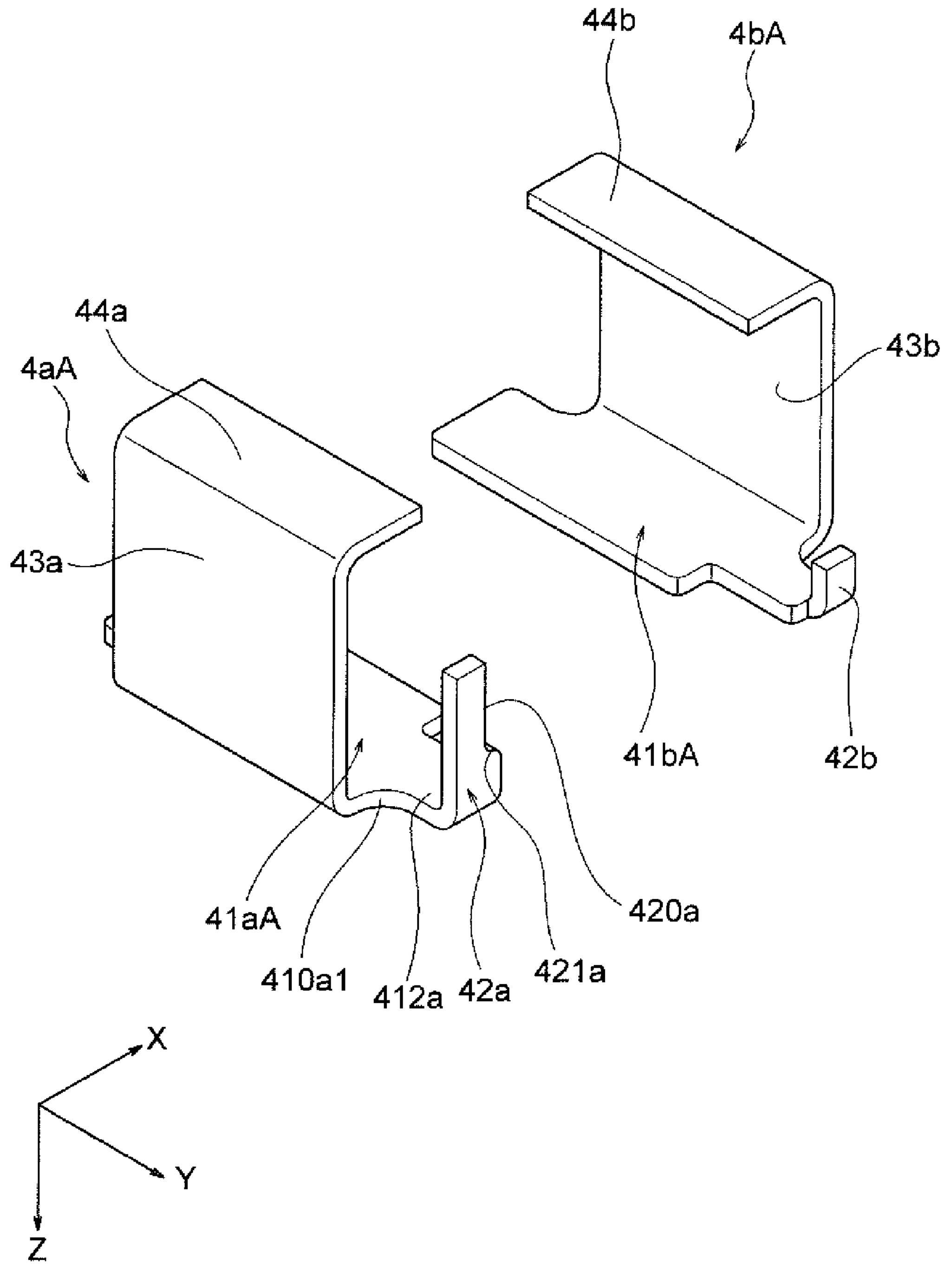
FIG. 9 is a perspective view of a pair of terminals shown in FIG. 8.

As shown in FIG. 8, the inductor 1A includes terminals 4*a*A, 4*b*A, which differ from the terminals 4*a*, 4*b* in the first embodiment in that the terminals 4*a*A, 4*b*A include base portions 41*a*A, 41*b*A. As shown in FIG. 9, the base portions 41*a*A, 41*b*A do not have a bifurcated shape, unlike the base portions 41*a*, 41*b* (FIG. 4) in the first embodiment, and have a substantially rectangular shape.

As shown in FIG. 8, in the present embodiment, each end portion of the bottom surface 2*b* of the coil 2 in the X-axis direction are placed on upper surfaces of the base portions 41*a*A, 41*b*A, and the coil 2 is supported by the base portions 41*a*A, 41*b*A. As described above, the coil 2 is disposed inside the core 8 so that a center thereof is displaced rearward from the center of the core 8. Therefore, as shown in FIG. 9, the base portions 41*a*A, 41*b*A protrude rearward (outward) in the Y-axis direction more than the connecting portions 43*a*, 43*b* in order to support the coil 2 that is displaced rearward thereof.

The present embodiment also has the same effect as the first embodiment. In the present embodiment, when the inductor 1A is manufactured, the coil 2 can be disposed inside the mold together with the terminals 4*a*A, 4*b*A with the bottom surface of the coil 2 placed on the base portions 41*a*A, 41*b*A. By mounting the bottom surface of the coil 2 on the base portions 41*a*A, 41*b*A in this way, the bottom surface of the coil 2 is supported by the base portions 41*a*A, 41*b*A. Therefore, the coil 2 is less likely to be displaced in the Z-axis direction, and the position of the bottom surface of the coil 2 is fixed to the position of the upper surfaces of the base portions 41*a*A, 41*b*A even if pressure is applied to the coil 2 during compression molding. Therefore, it is possible to set the position of the coil 2 at a predetermined position inside the core 8, thereby preventing variations in inductance characteristics and the like for each product due to variations in the position of the coil 2, and an inductor 1A with a high reliability can be obtained.

Note that the present invention is not limited to the above embodiments, and various modifications can be made within the scope of the present invention.

In each of the above-described embodiments, application examples of the present invention to inductors have been shown, but the present invention may be applied to coil devices other than inductors.

In each of the above embodiments, the wire 3 is made of a flat wire, but may be made of a wire other than a flat wire such as a round wire or a square wire.

In each of the above-described embodiments, the wire 3 is wound in a circular spiral shape, but it may be in an elliptical spiral shape, an angular spiral shape, or the like.

In each of the above embodiments, the core 8 is constituted by two cores, the first core 5 and the second core 6, but the core 8 of the inductor 1 may be constituted by only one core. In this case, the core 8 may be formed inside the mold by compaction molding, injection molding, or the like.

REFERENCE SIGNS LIST

1, 1A inductor (coil device)
2 coil
2*a* upper surface
2*b* bottom surface
2*c* first lead-out position
2*d* second lead-out position
2*e* outer peripheral surface
2*f* inner peripheral surface
3 wire
3*a*, 3*b* lead portion
3*a*1, 3*b*1 lead bottom portion
3*a*2, 3*b*2 inner side surface
3*a*3, 3*b*3 outer side surface
30 insulation coating
4*a*, 4*b*, 4*a*A, 4*b*A terminal

41*a*, 41*b*, 41*a*A, 41*b*A base portion
410*a*, 410*b* main branch portion
411*a*, 411*b* sub branch portion
412*a*, 412*b* main protruding portion
413*a*, 413*b* sub protruding portion
414*a*, 414*b* main curved portion
415*a*, 415*b* sub curved portion
416*b* recess
42*a*, 42*b* wire connecting portion
420*a* notch portion
421*a* notch bottom portion
43*a*, 43*b* connecting portion
44*a*, 44*b* mounting portion
45*a*, 45*b* groove portion
5 first core
6 second core
7 frame
8 core
8*a* mounting surface
8*b* non-mounting surface
80 side recess
9 melted portion

What is claimed is:

1. A coil device, comprising:

a first terminal including a first wire connecting portion connected to a first lead portion of a coil;

a second terminal including a second wire connecting portion connected to a second lead portion of the coil; and an element body covering the coil together with the first wire connecting portion and the second wire connecting portion, wherein the first lead portion is led out in a front-rear direction of the element body, the second lead portion is led out in the front-rear direction of the element body, the first wire connecting portion is positioned outside the first lead portion along a left-right direction perpendicular to the front-rear direction of the element body, the second wire connecting portion is positioned outside the second lead portion along the left-right direction perpendicular to the front-rear direction of the element body, the first wire connecting portion has a first main surface and a first side surface that is perpendicular to the first main surface and has a narrower width than the first main surface, the second wire connecting portion has a second main surface and a second side surface that is perpendicular to the second main surface and has a narrower width than the second main surface, the coil is disposed inside the element body such that each of thickness directions of the first lead portion and the second lead portion substantially coincides with the left-right direction of the element body, an outer surface in the thickness direction of the first lead portion is mainly connected to the first side surface, and an outer surface in the thickness direction of the second lead portion is mainly connected to the second side surface.

2. The coil device according to claim 1, wherein the first lead portion is connected to the first wire connecting portion at a first connecting portion, the second lead portion is connected to the second wire connecting portion at a second connecting portion, the first connecting portion is unevenly distributed outside the first lead portion in a thickness direction of the first lead portion, and the second connecting portion is unevenly distributed outside the second lead portion in a thickness direction of the second lead portion.

3. The coil device according to claim 1, wherein the first lead portion and the second lead portion are led out in substantially the same direction along the front-rear direction of the element body.

4. The coil device according to claim 1, wherein when the element body is viewed from the front-rear direction, at least a part of the first lead portion is positioned inside a first lead-out position on an outer peripheral surface of the coil from which the first lead portion is led out, and at least a part of the second lead portion is positioned inside a second lead-out position on the outer peripheral surface of the coil from which the second lead portion is led out, along the left-right direction of the element body.

5. The coil device according to claim 1, wherein the first terminal further includes a first base portion disposed substantially parallel to a bottom surface of the element body, the second terminal further includes a second base portion disposed substantially parallel to the bottom surface of the element body, the first wire connecting portion extends upward from the first base portion, and the second wire connecting portion extends upward from the second base portion.

6. The coil device according to claim 5, wherein an inner edge of the first base portion is positioned outside an inner surface of the first lead portion in a thickness direction of the first lead portion along the left-right direction of the element body, and an inner edge of the second base portion is positioned outside an inner surface of the second lead portion in a thickness direction of the second lead portion along the left-right direction of the element body.

7. The coil device according to claim 5, wherein a position of an end portion of the first wire connecting portion along a winding axis direction of the coil and a position of an end portion of the second wire connecting portion along the winding axis direction of the coil are displaced from each other.

8. The coil device according to claim 5, wherein the first lead portion is positioned above the second lead portion along a winding axis direction of the coil, and a length of the first wire connecting portion along the winding axis direction of the coil is longer than a length of the second wire connecting portion along the winding axis direction of the coil.

9. The coil device according to claim 5, wherein a notch portion cut along a winding axis direction of the coil is formed on an inner edge of the first wire connecting portion, and the first lead portion is fixed at a position spaced upward from a bottom of the notch portion in the winding axis direction.

10. The coil device according to claim 5, wherein the first lead portion is connected to the first wire connecting portion at a position spaced upward from an upper surface of the first base portion, and the second lead portion is placed on the second base portion and connected to the second wire connecting portion.

11. The coil device according to claim 5, wherein
the first base portion includes a first main branch portion and a first sub branch portion,
the first main branch includes a first main protruding portion protruding forward of the element body,
the first sub branch portion includes a first sub protruding portion protruding rearward of the element body, and
one of the first main protruding portion and the first sub protruding portion is displaced from the other of the first main protruding portion and the first sub protruding portion along the left-right direction of the element body.

12. The coil device according to claim 11, wherein
an outer edge of the first main branch portion is curved forward from a side of the element body inside the element body,
an outer edge of the first sub branch portion is curved rearward from a side of the element body inside the element body, and
a radius of curvature of the outer edge of the first main branch is different from a radius of curvature of the outer edge of the first sub branch portion.

13. The coil device according to claim 1, wherein
the first main surface and the second main surface face at least one of a front surface and a rear surface of the element body in the front-rear direction.

14. A coil device, comprising:
a first terminal including a first wire connecting portion connected to a first lead portion of a coil;
a second terminal including a second wire connecting portion connected to a second lead portion of the coil; and
an element body covering the coil together with the first wire connecting portion and the second wire connecting portion, wherein
the first lead portion is led out in a front-rear direction of the element body,
the second lead portion is led out in the front-rear direction of the element body,
the first wire connecting portion is positioned outside the first lead portion along a left-right direction perpendicular to the front-rear direction of the element body,
the second wire connecting portion is positioned outside the second lead portion along the left-right direction perpendicular to the front-rear direction of the element body,
the first terminal further includes a first base portion disposed substantially parallel to a bottom surface of the element body,
the second terminal further includes a second base portion disposed substantially parallel to the bottom surface of the element body,
the first wire connecting portion extends upward from the first base portion,
the second wire connecting portion extends upward from the second base portion,
an inner edge of the first base portion is positioned outside an inner surface of the first lead portion in a thickness direction of the first lead portion along the left-right direction of the element body, and
an inner edge of the second base portion is positioned outside an inner surface of the second lead portion in a thickness direction of the second lead portion along the left-right direction of the element body.

15. A coil device, comprising:
a first terminal including a first wire connecting portion connected to a first lead portion of a coil;
a second terminal including a second wire connecting portion connected to a second lead portion of the coil; and
an element body covering the coil together with the first wire connecting portion and the second wire connecting portion, wherein
the first lead portion is led out in a front-rear direction of the element body,
the second lead portion is led out in the front-rear direction of the element body,
the first wire connecting portion is positioned outside the first lead portion along a left-right direction perpendicular to the front-rear direction of the element body,
the second wire connecting portion is positioned outside the second lead portion along the left-right direction perpendicular to the front-rear direction of the element body,
the first terminal further includes a first base portion disposed substantially parallel to a bottom surface of the element body,
the second terminal further includes a second base portion disposed substantially parallel to the bottom surface of the element body,
the first wire connecting portion extends upward from the first base portion,
the second wire connecting portion extends upward from the second base portion,
the first base portion includes a first main branch portion and a first sub branch portion,
the first main branch includes a first main protruding portion protruding forward of the element body,
the first sub branch portion includes a first sub protruding portion protruding rearward of the element body,
one of the first main protruding portion and the first sub protruding portion is displaced from the other of the first main protruding portion and the first sub protruding portion along the left-right direction of the element body,
an outer edge of the first main branch portion is curved forward from a side of the element body inside the element body,
an outer edge of the first sub branch portion is curved rearward from a side of the element body inside the element body, and
a radius of curvature of the outer edge of the first main branch is different from a radius of curvature of the outer edge of the first sub branch portion.

* * * * *